United States Patent [19]

Kobayashi et al.

[11] Patent Number: 5,269,008
[45] Date of Patent: Dec. 7, 1993

[54] METHOD AND APPARATUS FOR PRE-PROCESSING THE SOURCE OF A POP INSTRUCTION IN A PIPELINE COMPUTER

[75] Inventors: Souichi Kobayashi; Masahito Matuo, both of Itami, Japan

[73] Assignee: Mitsubishi Denki Kabushiki Kaisha, Tokyo, Japan

[21] Appl. No.: 754,285

[22] Filed: Aug. 30, 1991

Related U.S. Application Data

[63] Continuation of Ser. No. 331,562, Mar. 30, 1989, abandoned.

[30] Foreign Application Priority Data

Oct. 4, 1988 [JP]  Japan ................... 63-251076

[51] Int. Cl.⁵ ............................................ G06F 9/38
[52] U.S. Cl. .................................... 395/375; 395/800; 364/DIG. 1; 364/231.8; 364/263
[58] Field of Search ............... 364/200, 900, DIG. 1, 364/DIG. 2; 395/375, 400, 425, 775, 800

[56] References Cited

U.S. PATENT DOCUMENTS

| | | | |
|---|---|---|---|
| 4,305,124 | 12/1981 | Marro et al. | 364/200 |
| 4,398,245 | 8/1983 | Fujita | 364/200 |
| 4,454,578 | 6/1984 | Matsumoto et al. | 364/200 |
| 4,974,158 | 11/1990 | Watanabe et al. | 395/775 |

*Primary Examiner*—Thomas C. Lee
*Assistant Examiner*—John C. Loomis
*Attorney, Agent, or Firm*—Townsend and Townsend Khourie and Crew

[57] ABSTRACT

A data processor which includes a pipeline processing unit that processes instructions, including a POP instruction. The POP instruction includes a destination operand field and has a stack top as a source. The destination for the POP instruction can be register or a memory location. The pipeline processing unit is capable of performing pre-processing with respect to both the source and destination operands prior to execution by an execution stage of the pipeline processing unit. When the destination is a memory location, pre-processing of the destination uses information from the destination operand field. When the destination operand is a general register, steps for pre-processing of the destination are merged prior to the execution stage. Pre-processing of the source uses information from the stackpointer and is conducted prior to the execution phase in response to the decoding of the operation code field of the POP instruction.

12 Claims, 25 Drawing Sheets (ADDRESS)

←LOW ADDRESS        HIGH ADDRESS→
←MSB SIDE              LSB SIDE→

→→DIRECTION OF READ INSTRUCTION→→

BASIC INSTRUCTION FORMAT OF DATA
PROCESSOR OF THIS INVENTION

Fig. 34

| INSTRUCTION | STEP NUMBER | RCODE/RCODE EFFECTIVE SIGNAL | REGISTER NUMBER CONTROL | | SIZE CONTROL | |
|---|---|---|---|---|---|---|
| | | | Rs | Rd | Ws | Wd |
| POP | 1 | EN ONLY WHEN DESTINATION IS MEMORY | — | Rr | — | Wr |
| | 2 | ALWAYS EN | Rr | Don't Change | Rr | Don't Change |

— : NO DESIGNATION
EN : ENABLE

METHOD AND APPARATUS FOR PRE-PROCESSING THE SOURCE OF A POP INSTRUCTION IN A PIPELINE COMPUTER

This is a continuation of U.S. application Ser. No. 07/331,562, filed Mar. 30, 1989, now abandoned.

BACKGROUND OF THE INVENTION

1. Field of the Invention

The present invention relates to a data processor operated by a pipeline processing system, and specifically relates to a data processor having a function of processing a POP instruction.

2. Description of the Prior Art

FIG. 1 is a block diagram showing a configuration of a pipeline processing mechanism of a conventional data processor.

The pipeline processing mechanism of the conventional data processor is configured with an instruction fetch stage 391, an instruction decoding stage 392, an operand address calculation stage 393, an operand fetch stage 394 and an execution stage 395. Then, an instruction is decomposed into a plurality of unit codes (step codes) for pipeline processing in the decoding step, undergoing pipeline processing. The detail of such a data processor is disclosed in the Japanese Patent Application Laid-Open No. 63-89932 (1988).

In the pipeline processing mechanism of the conventional data processor as described above, elements configurating a pipeline are divided between portions for pre-processing such as the instruction fetch stage 391, the instruction decoding stage 392, the operand address calculation stage 393 and the operand fetch stage 394 and a portion for executing an instruction such as the execution stage 395.

The portions for pre-processing only perform pre-processing relating to an operand designated in the instruction. Then, the instruction is executed in the execution stage 395 using the operand prepared by the pre-processing.

However, in such a data processor, an instruction, in which only one operand designating part is included but other operands are required by instruction function, is performed no sufficient pre-processing on the pipeline.

For an example of such an instruction, a POP instruction is considered. The POP instruction enables a memory or register to be designated as a destination. In the data processor, normally, a stack for retreating data is formed in a memory space. Then, an instruction for retreating data in the stack and an instruction for reading the retreated data from the stack are provided. The former instruction is so called the PUSH instruction, and the latter instruction is so called the POP instruction respectively, and these instructions are symmetrical each other. In addition, a stack pointer (SP) indicates the address of the highest order (stack top) of the stack all the time.

The POP instruction is a one-operand instruction having only one operand for designating destination. However, as to the function of the instruction itself, the POP instruction actually is a two-operand instruction implying that a source operand is the stack top, and is equivalent to a transfer instruction between memory and memory or between memory and register.

In processing the POP instruction, on the pipeline of the conventional data processor, only a step code for processing destination is generated by a destination designating part of the POP instruction. The processing of this step code refers to performing address calculation of destination in the operand address calculation stage 393 which is a portion pre-processing an instruction. Since the POP instruction has no designating part of source operand, the step code relating to the source is not generated, and the preprocessing relating to the source designating part is not performed at all.

The processing relating to the source designating part is executed in the execution stage 395 which is a portion executing the instruction by a series of micro instructions when the POP instruction is executed. Specifically, in the processing relating to a source operand of POP instruction at the execution stage 395, first the data is fetched from the stack top and the fetched data is transferred to the destination address prepared pre-processing.

In performing such a processing, the processing relating to the source designating part to be performed as a preprocessing in a normal two-operand instruction is performed in the execution stage 395, and therefore the processing load of the execution stage 395 is very heavy. Also, unevenness of processing load in each stage takes place, and therefore a reduction in the processing efficiency of the pipeline processing is brought on.

In the conventional data processor, as described above, the POP instruction is processed in the pipeline processing mechanism. At this time, the execution stage itself is required to perform the processing of fetching the operand from the stack top, and therefore the load of data processing in the stage executing the instruction becomes larger in comparison with the pre-processing stages, and therefore a problem exists that the processing efficiency of the POP instruction is not improved.

SUMMARY OF THE INVENTION

The present invention has been achieved to solve such a problem, and purposes to provide a data processor capable of efficiently processing a one-operand instruction wherein a source operand is limited to a specific addressing mode on a pipeline.

A data processor in accordance with the present invention comprises a means for generating a processing unit of the source operand implied at decoding an instruction in processing the POP instruction and a means which processes a processing unit of a destination operand and a processing unit of a source operand so as to generate one processing unit before executing the instruction in the case where the destination is a register. In the data processor of the prevent invention, by adopting such a configuration, in the pre-processing stages in the pipeline processing mechanism, a processing unit is generated also for the source operand implied in the POP instruction, and data in the stack top undergoes prefetch processing, and in the case where the destination is a register, the processing relating to the destination operand is not preformed.

The above and further objects and features of the invention will more fully be apparent from the following detailed description with accompanying drawings.

BRIEF DESCRIPTION OF THE DRAWINGS

FIG. 34 is a table showing contents of a R code/F code enable signal, a register number control signal and a size control signal which are outputs of a second decoder in FIG. 31, FIGS. 35(a) and 35(b) are flow charts showing processing sequences of a POP instruction in a pipeline processing mechanism.

DESCRIPTION OF THE PREFERRED EMBODIMENTS

Hereinafter, detailed description is made on the present invention based on drawings showing one embodiment thereof.

(1) "Instruction Format of Data Processor of the Present Invention"

An instruction of a data processor of the present invention is formed on a 16-bit unit basis, being variable in length, and no instruction of odd bytes is used herein.

The data processor of the present invention has an instruction format system specifically devised for the purpose of writing a highly frequent instruction in a short format. For example, as to a two-operand instruction, two formats are provided; a general-type format which has basically a configuration of "four bytes + extension part(s)" and allows the utilization of all addressing modes and a reduced-type format allowing only the use of a highly frequent instruction and an addressing mode.

The meaning of symbols appearing in the instruction format of the data processor of the present invention are as follows:

—: Portion wherein operation code is put.
: Portion wherein literal or immediate value is put.
Ea: Portion for generating an operand in a general-type 8-bit addressing mode.
Sh: Portion for designating an operand in a reduced-type 6-bit addressing mode.
Rn: Potion for designating an operand in a register by the register number.

Figure 1:
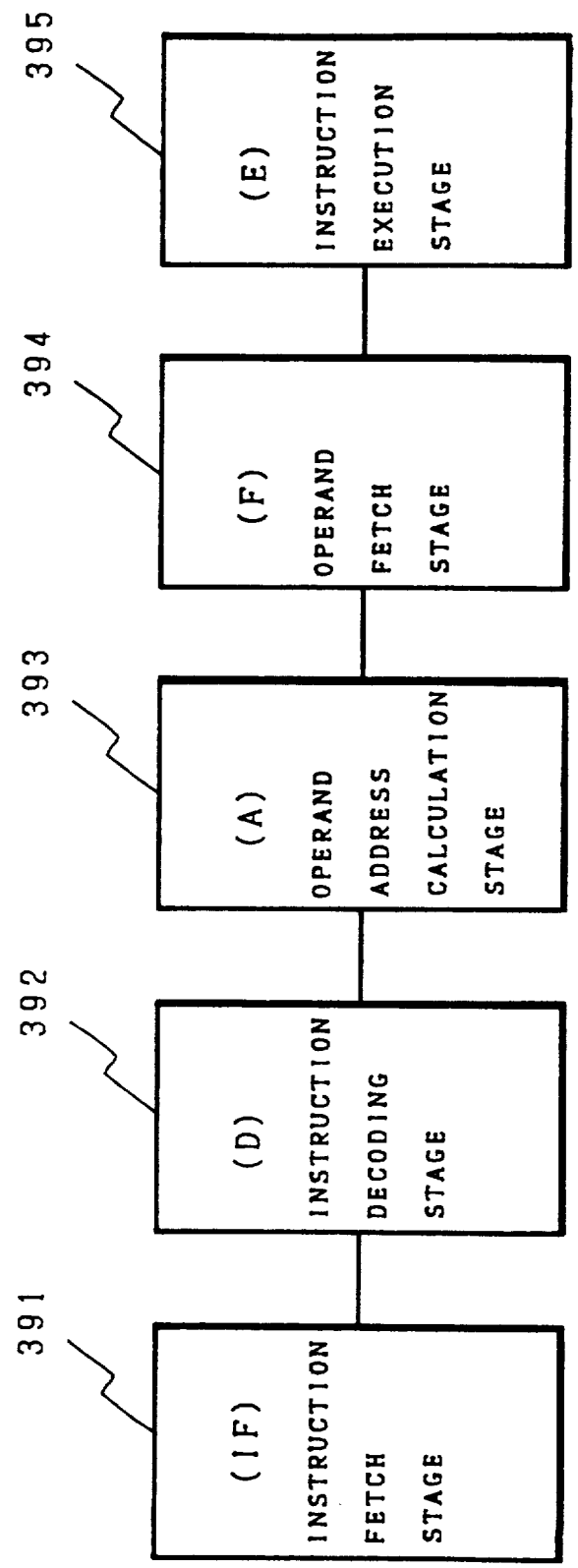
FIG. 1 is a block diagram showing a configuration of a pipeline processing mechanism in a conventional data processor.
Figure 2:
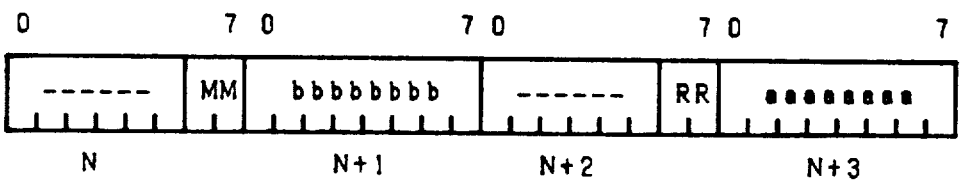
FIG. 2 is a schematic diagram showing a typical form of an instruction format of a data processor in accordance with the present invention.

In the format, as shown in FIG. 2, the right side is the LSB side and is high address. The instruction format can be discriminated only after an address N and an address N+1 checked, and as described above, this is because of a premise that the instruction is fetched and decoded on a 16-bit (2-byte) unit without fail.

In the data processor of the present invention, in the case with any format, the extension part of Ea or Sh of each operand is sure to be positioned immediately after a half word comprising the basic part of that Ea or Sh. This takes precedence over the immediate value data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part takes precedence over the next instruction. For example, consideration is made on the case of 6-byte instruction which comprises Ea1 in a first half word, Ea2 in a second half word, and ends with a third half word. Since the chained addressing mode is used for Ea1, another extension part of the chained addressing mode is assumed to be attached in addition to the ordinary extension part, and then the actual instruction bit pattern is composed in the sequence of the first word of instruction (including the basic part of Ea1), the expansion part of Ea1, the chained addressing mode extension part, the second half word of instruction (including the basic part of Ea2), the expansion part of Ea2 and the third half word of instruction.

(1.1) "Reduced-Type Two-Operand Instruction"

FIG. 3 through FIG. 6 are schematic diagrams showing reduced-type formats of the two-operand instruction.

Figure 3:
FIG. 3 is a schematic diagram showing a reduced-type format of an operational instruction between memory and register.

FIG. 3 is a schematic diagram showing a format of an operational instruction between memory and register. This format includes a L-format wherein the source operand side is a memory and a S-format wherein the destination operand side is a memory.

In the L-format, Sh represents the designating field of the source operand, Rn represents the designating field of the register of the destination operand and RR represents designating of the operand size of Sh, respectively. The size of the destination operand located in the register is fixed to 32 bits. Where the size of the resister side differs from that of the memory side and the size of the source side is smaller, sign extension is performed.

In the S-format, Sh represents the designating field of the destination operand, Rn represents the register designating field of the source operand and RR represents designating of the operand size of Sh, respectively. The size of the source operand located in the register is fixed to 32 bits. Where the size of the register side differs from that of the memory side and the size of the source side is larger, truncating of the overflow portion and overflow check are performed.

Figure 4:
FIG. 4 is a schematic diagram showing a reduced-type format of an operational instruction between register and register.

FIG. 4 is a schematic diagram showing a format of an operational instruction between register and register (R-format). Rn represents the designating field of the destination register, and Rm represents the designating field of the source register. The operand size is 32 bits only.

Figure 5:
FIG. 5 is a schematic diagram showing a reduced-type format of an operational instruction between literal and memory.

FIG. 5 is a schematic diagram showing a format of an operational instruction between literal and memory (Q-format). MM shows the designating field of the destination operand size, ### shows the designating field of the source operand by literal, and Sh shows the designating field of the destination operand.

Figure 6:
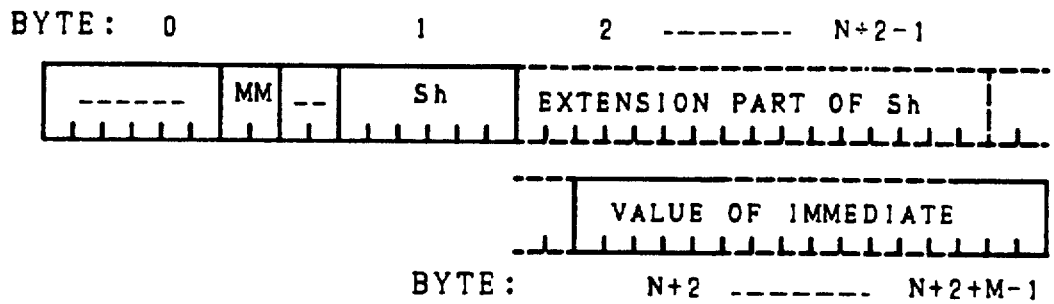
FIG. 6 is a schematic diagram showing a reduced-type format of an operational instruction between immediate value and memory.

FIG. 6 is a schematic diagram showing a format of an operational instruction between immediate value and memory (I-format). MM represents the designating field of the operand size (common in source and destination), and Sh represents the designating field of the destination operand. The sizes of the immediate value of the I-format are 8, 16 and 32 bits in common with the sizes of the operand of the destination side, and zero extension and sign extension are not performed.

(1.2) "General-Type One-Operand Instruction"

Figure 7:
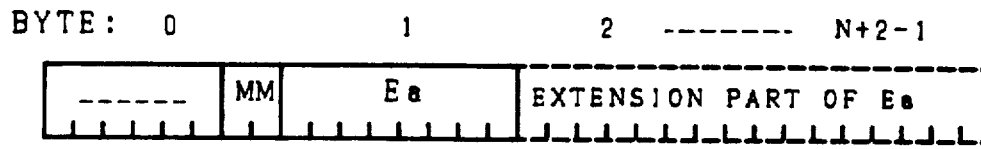
FIG. 7 is a schematic diagram showing a general-type format of a one-operand instruction.

FIG. 7 is a schematic diagram showing a general-type format of one-operand instruction (G1-format). MM represents the designating field of the operand size. Some of the G1-format instructions comprise an extension part besides the extension part of Ea. There are also instructions using no MM.

(1.3) "General-Type Two-Operand Instruction"

Figure 8:
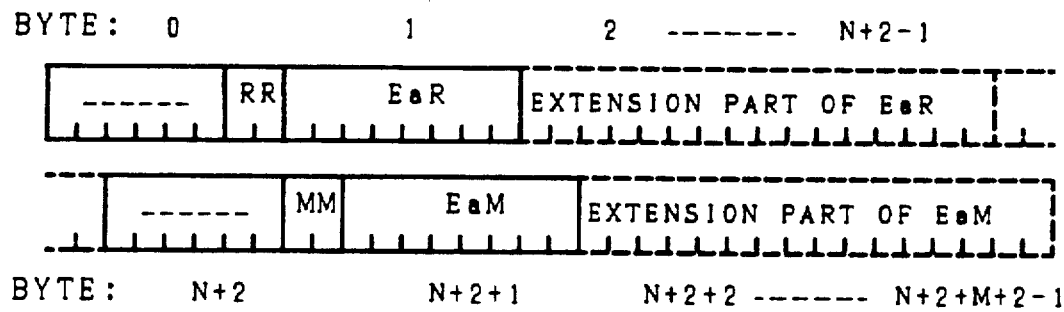
FIG. 8 is a schematic diagram showing s general-type format of a two-operand instruction wherein a first operand instruction necessitates memory read-out.
Figure 9:
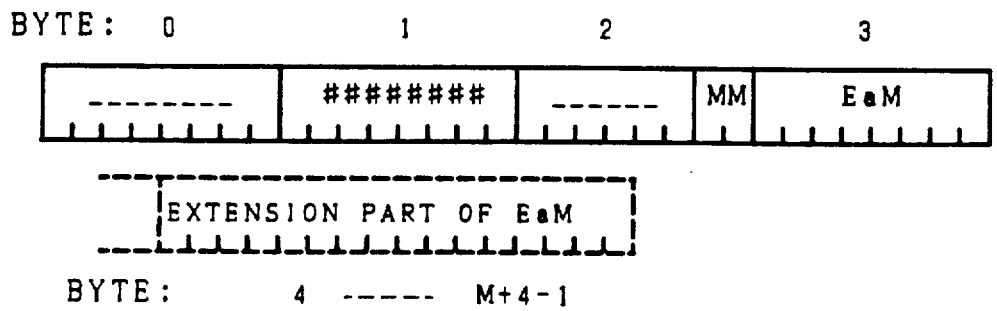
FIG. 9 is a schematic diagram showing a general-type format of a two-operand instruction wherein a first operand is an eight-bit immediate value.
Figure 10:
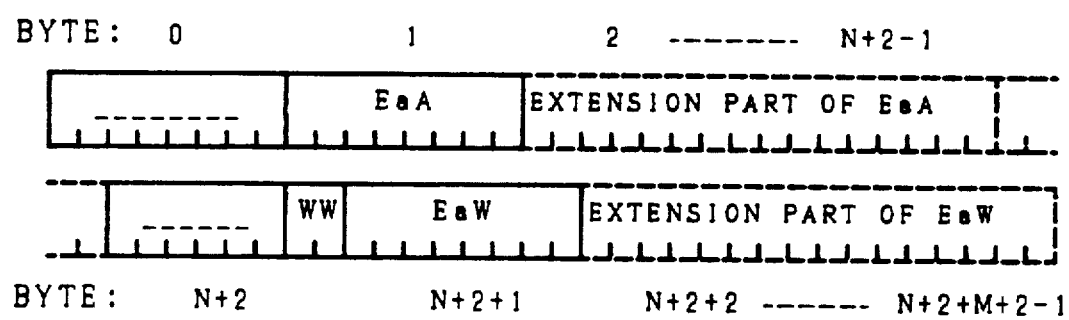
FIG. 10 is a schematic diagram showing a general-type format of a two-operand instruction wherein a first operand is only address calculation.

FIG. 8 through FIG. 10 are schematic diagrams showing general-type formats of two-operand instruction. This format comprises an instruction having a maximum of two operands of the general-type addressing mode which are designated by eight bits. There are cases where the total number itself of operands three or more.

FIG. 8 is a schematic diagram showing a format of an instruction wherein a first operand necessitates memory read-out (G-format). EaM represents the designating field of the destination operand, MM represents the designating field of the destination operand size, EaR represents the designating field of the source operand, and RR represents the designating field of the source operand size. Some of the G-format instructions comprise an extension part besides the extension part of EaR.

FIG. 9 is a schematic diagram showing a format of an instruction wherein a first operand is an instruction of eight-bit immediate value (E-format). EaM represents the designating field of the destination operand, MM represents the designating field of the destination operand size, and ## . . . represents the source operand value.

The E-format and the I-format have similar functions, but their conceptions greatly differ from each other. Specifically, the E-format is coherently of a type derived from the general type of two-operand (G-format), the size of source operand is eight-bit fixed, and the size of destination operand is selected from among 8, 16 and 32 bits. This means that the E-format presupposes operation between different sizes, and the source operand of eight bits is zero-extended or code-extended in a manner of agreeing with the size of the destination operand. On the other hand, the I-format is of a type that the patterns of immediate value having high frequency particularly in the transfer instruction and the comparison instruction are shortened, and the sizes of the source operand and the destination operand are equal.

FIG. 10 is a schematic diagram showing a format of an instruction wherein a first operand is only address calculation. EaW represents the designating field of the destination operand, WW represents the designating field of the destination operand size, and EaA represents the designating field of the source operand. For the source operand, the calculation result itself of executed address is used.

Figure 11:
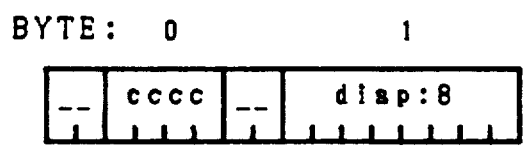
FIG. 11 is a schematic diagram showing an instruction format of short branch.

FIG. 11 is a schematic diagram showing a format of a short branch instruction. Symbol cccc represents the designating field of branch condition, disp:8 represents the designating field of displacement to a jump destination, and in the data processor of the present invention, when displacement is designated by eight bits, the displacement value is set by doubling the designated value in the bit pattern.

(1.4) "Addressing Mode"

The methods of designating the addressing mode of the data processor of the present invention include the reduced type designated by six bits including the register and the general type designating by eight bits.

Where an undefined addressing mode has been designated, or where a combination of addressing modes obviously unsuitable has been designated, a reserve instruction exception is generated likewise the case where the undefined instruction has been executed, and exception processing is started.

Equivalents to the above include the case where the designation is the immediate value mode and the case where the immediate value mode is used in the designating field of the addressing mode to be accompanied by address calculation.

Meanings of symbols used in the format diagram is as follows:

Rn: Register designating mem [EA]: Memory content of address as shown by EA (Sh): Designating methods by the reduced-type addressing mode of six bits (Ea): Designating method by the general-type addressing mode of eight bits In the format diagrams, the portion surrounded by a broken line shows the extension part.

(1.4.1) "Basic Addressing Modes"

The data processor of the present invention supports various addressing modes. Among them, the basic addressing modes supported by the data processor of the present invention include a register direct mode, a register indirect mode, a register relative indirect mode, an immediate value mode, an absolute mode, a PC (Program Counter) relative indirect mode, a stack pop mode and a stack push mode.

Figure 12:
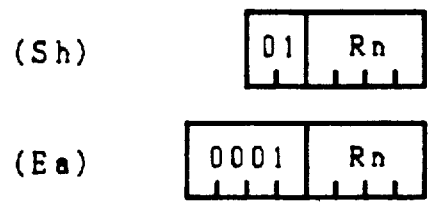
FIG. 12 is a schematic diagram showing a format wherein an addressing mode designating part is of a register direct mode.

The register direct mode takes the content of register intact as an operand. FIG. 12 is a schematic diagram of the format thereof. Symbol Rn shows the number of the general-purpose register.

Figure 13:
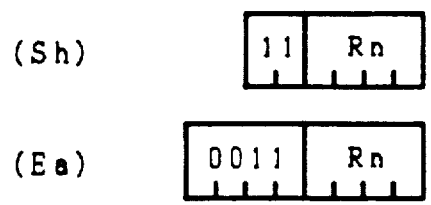
FIG. 13 is a schematic diagram showing a format wherein an addressing mode designating part is of a register indirect mode.

The register indirect mode takes the content of the memory whose address is the content of register as an operand. FIG. 13 is a schematic diagram of the format thereof. Symbol Rn shows the number of the general-purpose register.

Figure 14:
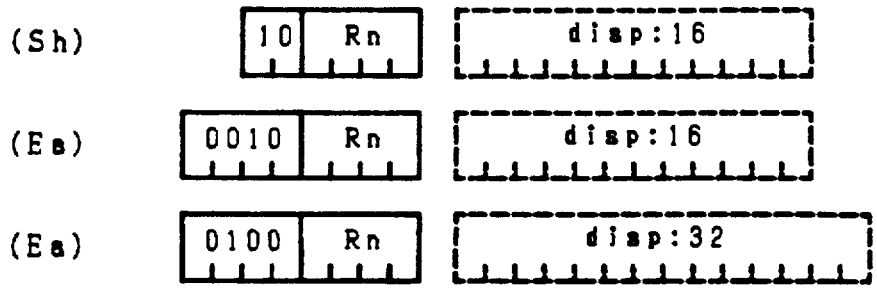
FIG. 14 is a schematic diagram showing a format wherein an addressing mode designating part is of a register relative indirect mode.

The register relative indirect mode includes two kinds of 16 bits and 32 bits of the displacement value. Each of them takes the content of the memory whose address is the value of the content of the register added to the displacement value of 16 bits or 32 bits as an operand. FIG. 14 is a schematic diagram of the format thereof. Symbol Rn shows the number of the general-purpose register. Symbols disp:16 and disp:32 show the displacement value of 16 bits and the displacement value of 32 bits, respectively. The displacement value is treated with a sign affixed.

Figure 15:
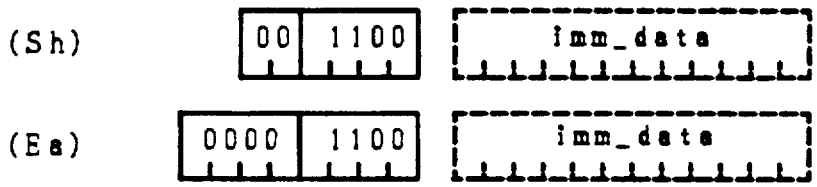
FIG. 15 is a schematic diagram showing a format wherein and addressing mode designating part is of an immediate value mode.

The immediate value mode takes the bit pattern designated in the instruction code as an operand while assuming it intact as a binary number. FIG. 15 is a schematic diagram of the format thereof. Symbol imm—data shows the immediate value. The size of imm—data is designated in the instruction as the operand size.

Figure 16:
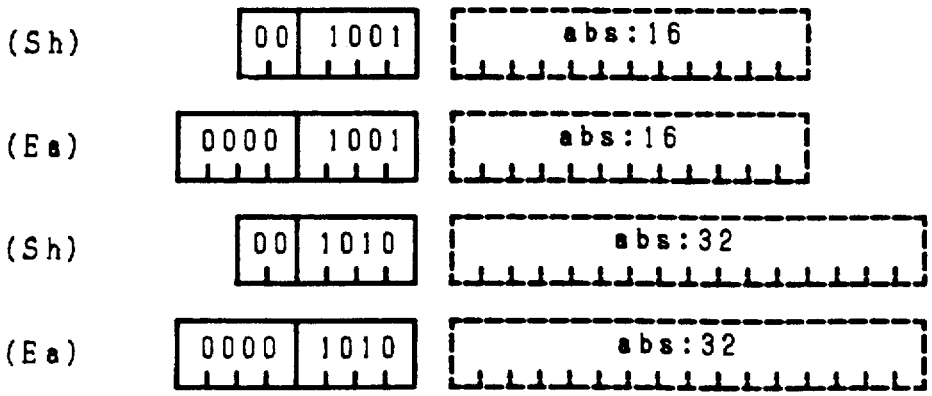
FIG. 16 is a schematic diagram showing a format wherein an addressing mode designating part is of an absolute mode.

The absolute mode includes two kinds of 16 bits and 32 bits for showing the address value. Each kind takes the content of the memory whose address is the bit pattern of 16 bits of 32 bits designated in the instruction code as an operand. FIG. 16 is a schematic diagram showing the format thereof. Symbols abs:16 and abs:32 show the address values of 16 bits and 32 bits, respectively. When the address is shown by abs:16, the designated address value is code-extended to 32 bits.

Figure 17:
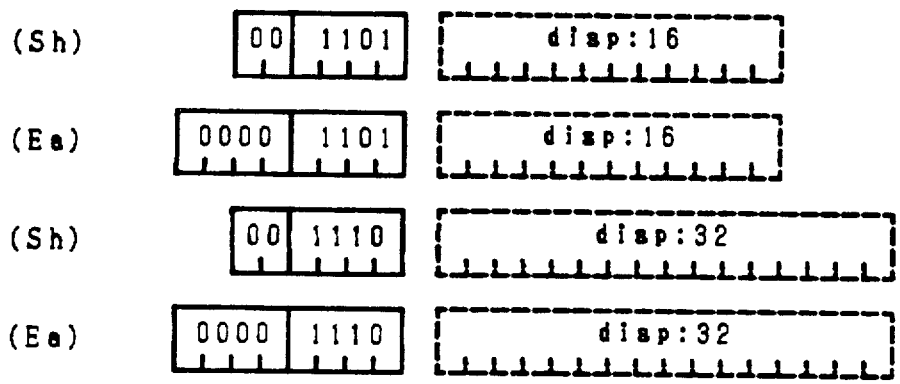
FIG. 17 is a schematic diagram showing a format wherein an addressing mode designating part is of a PC relative indirect mode.

The PC relative indirect mode includes two kinds of 16 bits and 32 bits of the displacement value. Each takes the content of the memory whose address is the value of the content of a program counter whereto the displacement value of 16 bits or 32 bits is added as an operand. FIG. 17 is a schematic diagram showing the format thereof. Symbols disp:16 and disp:32 show the displacement value of 16 bits and the displacement value of 32 bits, respectively. The displacement value is treated with a sign affixed. In the PC relative indirect mode, the value of the program counter to be referred is the head address of the instruction comprising the operand. Where the value of the program counter is referred in the chained addressing mode, the head address of the instruction is also used as a reference value of PC relativity.

Figure 18:
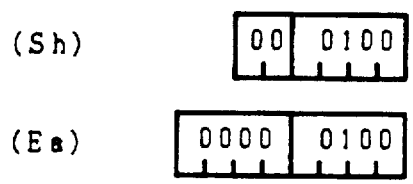
FIG. 18 is a schematic diagram showing a format wherein an addressing mode designating part is of a stack POP mode.

The stack pop mode takes the content of the memory whose address is the content of a stack pointer (SP) as an operand. After operand access, the stack pointer SP is incremented by the operand size. For example, where 32-bit data is handled, the SP is renewed (incremented) by +4 after the operand access. Designating of the stack pop mode for operands of sizes of B and H can also be performed, and the stack printer SP is renewed (incremented) by +1 and +2, respectively. FIG. 18 is a schematic diagram of the format thereof. As to the one wherein the stack pop mode is invalid for the operand, a reserve instruction exception is generated. Specifically, the stack pop mode designating for a write operand and read-modify-write operand becomes the reserve instruction exception.

Figure 19:
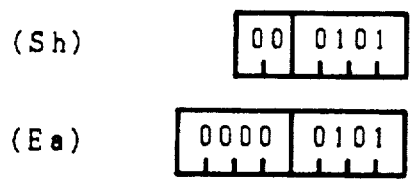
FIG. 19 is a schematic diagram showing a format wherein an addressing mode designating part is of a stack PUSH mode.

The stack push mode takes the content of the memory whose address is the content of the stack pointer SP decremented by the operand size as an operand. In the stack push mode, the stack pointer SP is decremented before operand access. For example, when handling 32-bit data, the stack pointer SP is renewed (decremented) by −4 before operand access. It is also possible to designate the stack push mode for operands of sizes of B and H, and the stack pointer SP is renewed (decremented) by −1 and −2, respectively. FIG. 19 is a schematic diagram showing the format thereof. As to the one wherein the stack push mode is invalid for the operand, a reserve instruction exception is generated. Specifically, the stack push mode designated for a read operand and a read-modify-write operand becomes the reserve instruction exception.

(1.4.2) "Chained Addressing Mode"

Addressing, whatever complicated, can basically be decomposed into combinations of addition and indirect reference. Accordingly, operations of addition and indirect reference are given in advance as primitives of addressing, and if they can be combined arbitrarily, any complicated addressing mode can be realized. The chained addressing mode of the data processor of the present invention is an addressing mode based on such a conception. A complicated addressing mode is particularly useful for data reference between modules or the processing system of AI (Artificial Intelligence) language.

When designating the chained addressing mode, in the basic addressing mode designated field, one from among three kinds of designating methods of a register base chained addressing mode, a PC base chained addressing mode and an absolute chained addressing mode is designated.

Figure 20:
FIG. 20 is a schematic diagram showing a format of a register base chained addressing mode.

The register base chained addressing mode is an addressing mode taking the value of register as the base value of the chained addressing to be extended. FIG. 20 is a schematic diagram showing the format thereof. Symbol Rn shows the number of the general-purpose register.

Figure 21:
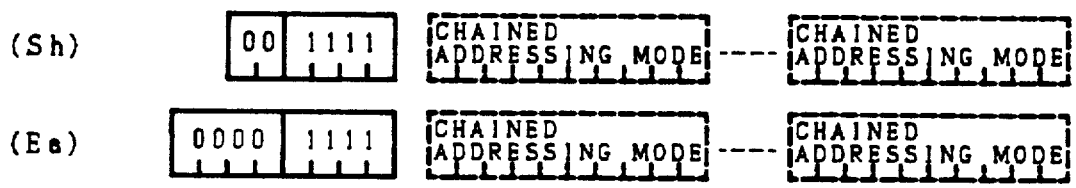
FIG. 21 is a schematic diagram showing a format of a PC base chained addressing mode.

The PC base chained mode is an addressing mode taking the value of the program counter (PC) as the base value of the chained addressing to be extended. FIG. 21 is a schematic diagram showing the format thereof.

Figure 22:
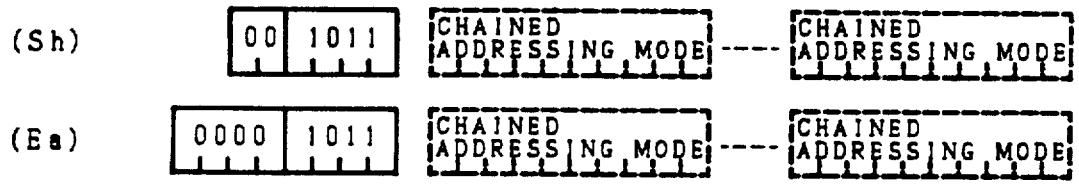
FIG. 22 is a schematic diagram showing a format of an absolute base chained addressing mode.

The absolute base chained addressing mode is an addressing mode taking zero as the base value of the chained addressing to be extended. FIG. 22 is a schematic diagram of the format thereof.

Figure 23:
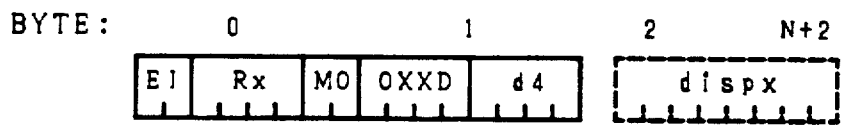
FIG. 23 is a schematic diagram showing designating fields for addition of displacement value, scaling and addition of index value, and indirect reference of memory in a format of one stage in a chained addressing mode.

The chained addressing mode designating field to be extended takes 16 bits as a unit, and this is repeated arbitrary times. By the chained addressing mode of one stage, addition of displacement, scaling ($\times 1$, $\times 2$, $\times 4$, $\times 8$) and addition of an index register, and indirect reference of a memory are performed. FIG. 23 is a schematic diagram showing the format of the chained addressing mode. Each field has meanings as shown below.

E=0: Continuation of the chained addressing mode is continued.

E=1: Address calculation ends. tmp→address of operand

I=0: No memory indirect reference is performed.
tmp+disp+Rx * Scale→tmp

I=1: Memory indirect reference is performed. mem tmp+disp+Rx * Scale→tmp

M=0: <Rx> is used as an index.

M=1: Special Index
<Rx>=0 Index value is not added.

(Rx=0)

<Rx>=1 Program counter is used as an index value.

(Rx=PC)

<Rx>=2-Reserved.

D=0: The value of field d4 of four bits in the chained addressing mode is quadrupled to be taken as a displacement value, and this value is added. The d4 is treated with a sign affixed, and is used by surely quadrupling it irrespective of the size of the operand.

D=1: The dispx (16/32 bits) designated in the extension part of the chained addressing mode is taken as a displacement value, the size of the extension part whereto this value is added is designated in the d4 field.

| | |
|---|---|
| d4 = 0001 | dispx: 16 bits |
| d4 = 0010 | dispx: 32 bits |

XX: Index scale (scale=1/2/4/8)

Where scaling of $\times 2$, $\times 4$, $\times 8$ has been performed for the program counter, an indefinite value is entered as an intermediate value (tmp) after completion of processing of that stage. The effective address obtained by this claimed addressing mode becomes an unpredictable value, but no exception. is generated. Designating of scaling for the program counter should not be performed.

Figure 24:
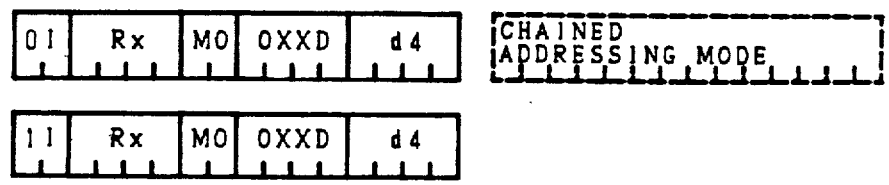
FIG. 24 is a schematic diagram showing a variation of whether or not the chained addressing mode is to be continued.
Figure 25:
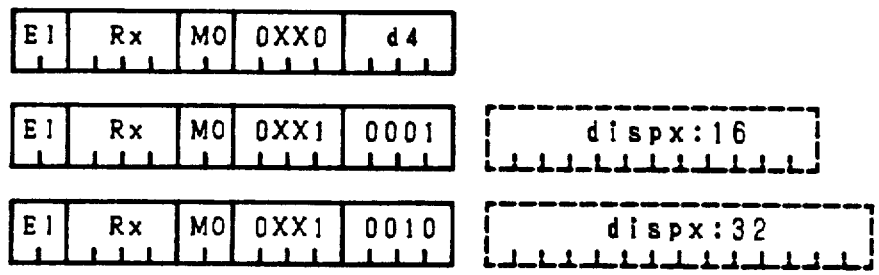
FIG. 25 is a schematic diagram showing a variation of size of displacement value.

FIG. 24 and FIG. 25 show variations on the instruction format formed by the chained addressing mode.

FIG. 24 shows variations of continuation and completion of chained addressing mode.

FIG. 25 shows variations on the size of displacement.

If the chained addressing mode of an arbitrary number of stages can be utilized, the case-sorting on a number of stages basis in the compiler can be dispensed with, and therefore an advantage of alleviating the burden on the compiler is obtainable. This is because, even if frequency of chained reference is very low, the compiler has to be able to generate a correct code without fail. For this reason, an arbitrary number of stages can be applied in the format.

(1.5) "Exceptional Processing"

The data processor of the present invention has abundant exceptional processing functions for alleviating software load. In the data processor of this invention, there are three kinds of the exceptional processing, which are reexecution of instruction processing (named exception), completion of instruction processing (named trap) and interruption. In the data processor of the present invention, these three kinds of exceptional processings and system faults are generally called EIT.

(2) "Configuration of Function Block"

Figure 26:
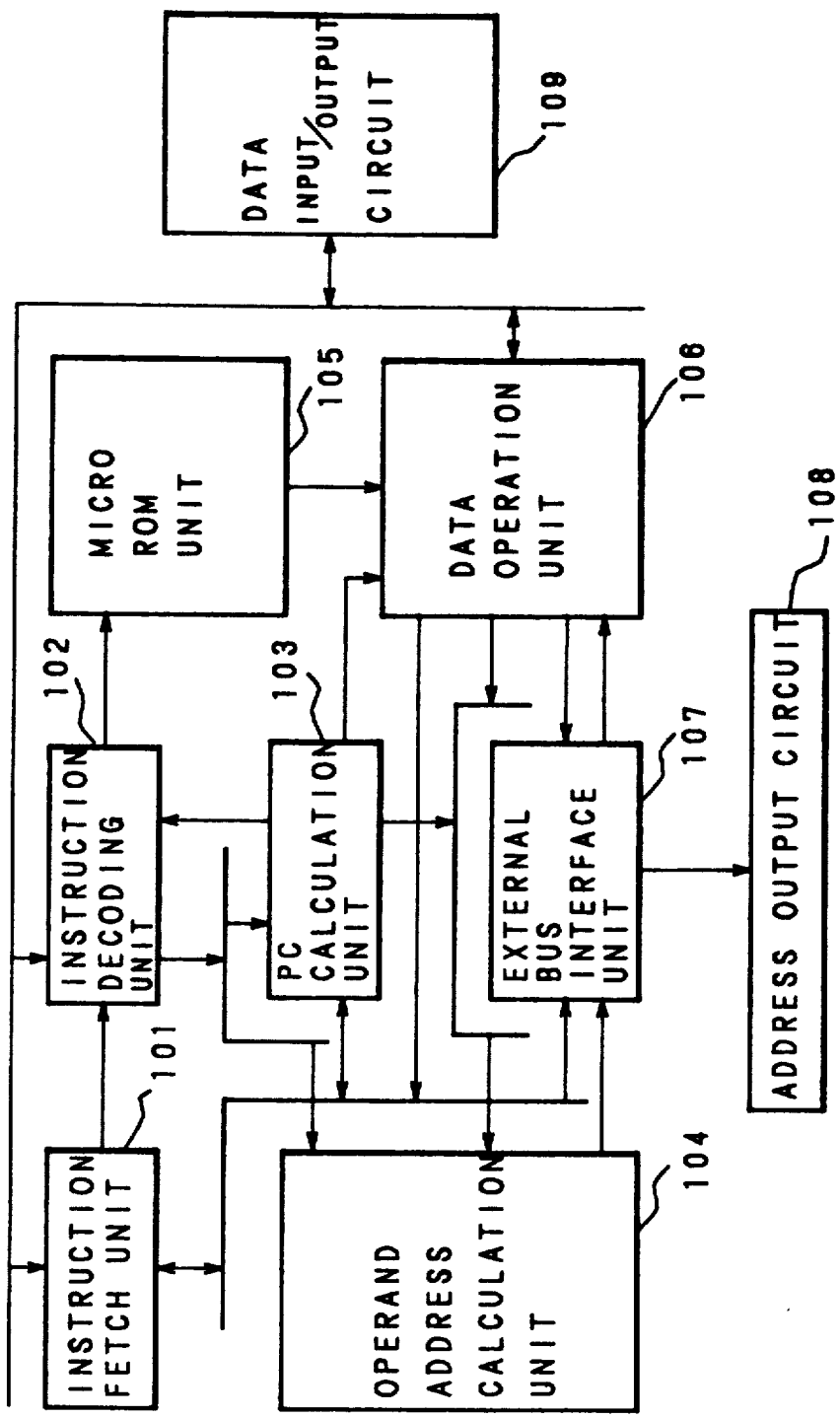
FIG. 26 is a block diagram showing a configuration of the data processor of the present invention.

FIG. 26 is a block diagram showing a configuration of the data processor of the present invention.

The interior of the data processor of the present invention is functionally divided roughly into an instruction fetch unit 101, an instruction decoding unit 102, a PC calculation unit 101, an operand address calculation unit 104, a micro ROM unit 105, a data operation unit 106 and an external bus interface unit 107.

In FIG. 26, in addition to the above-described units, an address output circuit 108 for outputting address to the exterior of a CPU and a data input/output circuit 109 for inputting and outputting data from and to the exterior of the CPU are shown separated from the other function block unit.

(2.1) "Instruction Fetch Units"

The instruction fetch unit 101 which comprises a branch buffer, an instruction queue and a controlling unit thereof, determines the address of an instruction of the fetched next and fetches the instruction from the branch buffer or a memory outside the CPU. It also performs instruction registering to the branch buffer.

The branch buffer is small-scaled, therefore operating as a selective cache.

Detailed description on the operation of the branch buffer is disclosed in the Japanese Patent Application Laid-Open No. 63-56731 (1988).

The address of an instruction to be fetched next is calculated by a dedicated counter as the address of the instruction to be inputted to an instruction queue 301. In the case where a branch or jump is generated, and address of a new instruction is transferred from the PC calculation unit 103 or the data operation unit 106.

In the case where an instruction is fetched from a memory outside the CPU, the address of the instruction to be fetched is outputted from the address output circuit 108 to the outside of the CPU through the external bus interface unit 107, and an instruction code is fetched from the data input/output circuit 109. Then, among the instruction codes in buffering, the instruction code to be decoded next is outputted to the instruction decoding unit 102.

(2.2) "Instruction Decoding Unit"

In the instruction decoding unit 102, basically an instruction code is decoded on a 16-bit (half word) basis. This block comprises a FHW decoder for decoding an operation code included in the first half word, a NFHW decoder for decoding an operation code including in the second and the third half words, and an addressing mode decoder for decoding an addressing mode. These FHW decoder, NFHW decoder and addressing mode decoder are generally called a first decoder 303.

There are also a second decoder 305 which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 102 decodes the instruction code being inputted from the instruction fetch unit 101 by 0–6 bytes per two clocks (one step). Among the results of decoding, information operation in the data operation unit 106 is outputted to the micro ROM unit 105, information on operand address calculation is outputted to the operand address calculation unit 104, and information on PC calculation is outputted to the PC calculation unit 103, respectively.

(2.3) "Micro ROM Unit"

The micro ROM unit 105 comprises a micro ROM for storing microprograms which mainly control the data operation unit 106, a micro sequencer, and a micro instruction decoder. A micro instruction is read out from the micro ROM once per two clocks (one step). The micro sequencer accepts processings of exception, interruption and trap (these three are generally called EIT) in a hardware manner in addition to the sequential processings shown by the microprograms. The micro ROM unit 105 also controls a store buffer. To the micro ROM unit 105, there are inputted flag information generated by interruption independent of the instruction code or by the result of operation execution, and output of an instruction decoding unit such as output of a second decoder 305. Output of the micro decoder is mainly performed to the data operation unit 106, but some information such as information of stopping other preceding processing due to execution of a jump instruction is outputted also to other blocks.

(2.4) "Operand Address Calculation Unit"

The operand address calculation unit 104 is controlled in a hardwired manner by information on operand address calculation outputted from the address decoder of the instruction decoding unit 102 or the like. In this block, substantially all of processings on operand address calculation are performed. Checking is made for whether or not the address of memory access for memory indirect addressing and the operand address can be entered in an I/O area mapped in the memory.

The result of address calculation is sent to the external bus interface unit 107. The values of the general-purpose register and the program counter required for address calculation are inputted from the data operation unit.

In performing the memory indirect addressing, the memory address to be referred is outputted from the address output circuit 108 to the outside of the CPU through the external bus interface unit 107, and the indirect address value inputted from the data input/output unit 109 is fetched through the instruction decoding unit 102.

(2.5) "Calculation Unit"

The PC calculation unit 103 is controlled in a hardwired manner by information on PC calculation outputted from the instruction decoding unit 102, and calculates the PC value of an instruction. The data processor of the present invention has a variable-length instruction set, and the length of that instruction can be found only after the instruction is decoded. For this reason, the PC calculation unit 103 generates the PC value of the next instruction by adding the length of the instruction outputted from the instruction decoding unit 102 to the PC value of the instruction in decoding. In the case where the instruction decoding unit 102 decodes a branch instruction and directs a branch in the decoding stage, the PC value of a branch destination instruction is calculated by adding a branch displacement in place of the instruction length to the PC value of the branch instruction. In the data processor of the present invention, performing a branch in the instruction decoding stage in response to the branch instruction is called pre-branch.

On this pre-branch approach, detailed description is disclosed in the Japanese Patent Application Laid-open NO. 63-59630 (1988) and the Japanese Patent Application Laid-Open No. 63-55639 (1988).

The result of calculation in the PC calculation unit 103 is outputted as the PC value of each instruction together with the result of decoding of the instruction, and in addition, is outputted to the instruction fetch unit 101 as the address of the instruction to be decoded next at prebranch. Also, it is used for the address for branch prediction of the instruction to be decoded next in the instruction decoding unit 102.

On the branch predicting approach, detailed description is disclosed in the Japanese Patent Application Laid-Open No 63-175934 (1988).

(2.6) "Data Operation Unit"

The data operation unit 106 is controlled by microprograms, and executes the operation required for realizing the function of each instruction by means of registers and an arithmetic unit according to output information of the micro ROM unit 105. In the case where the operand to be operated is an address or an immediate value, the address or the immediate value calculated in the operand address calculation unit 104 is obtained by passing it through the external bus interface unit 107. In the case where the operand to be operated is in a memory outside the CPU, the bus interface unit outputs the address calculated in the address calculation unit 104 from the address output circuit 108, and the operand fetched from the memory outside the CPU is obtained through the data input/output circuit 109.

Arithmetic units include an ALU 313, a barrel shifter, a priority encoder, a counter, and a shift register. The registers and the main arithmetic units are connected through three buses, and one micro instruction for directing operation between registers is processed in two clocks (one step).

In the case where an access to the memory outside the CPU is required at the data operation, the address is outputted from the address output circuit 108 to the outside of the CPU through the external bus interface unit 107 by the direction of the microprogram, and the aimed data is fetched through the data input/output circuit 109.

In the case where data is stored in the memory outside the CPU, the address is outputted from the address output circuit 108 through the external bus interface unit 107, and simultaneously the data is outputted from the data input/output circuit 109 to the outside of the CPU. In order to efficiently perform operand store, a four-byte store buffer is installed in the data operation unit 106.

In the case where the data operation unit 106 obtains a new instruction address by processing a jump instruction or an exceptional processing, this is outputted to the instruction fetch unit 101 and the PC calculation unit 103.

(2.7) "External Bus Interface Unit"

The external bus interface unit 107 controls communication through the external bus of the data processor of the present invention. All accesses to memories are performed in a clock-synchronized manner, and can be performed in a minimum of two clock cycles (one step).

Access requests to memories are generated independently from the instruction fetch unit 101, the operand address calculation unit 104 and the data operation unit 106. The external bus interface unit 107 mediates these memory access requests. Furthermore, the access to the data located at the memory address striding over the arrangement boundary of 32 bits (one word) which is the size of the data bus connecting the memory to the CPU is performed in a manner that striding over the word boundary is automatically detected in this block and the access is decomposed into memory accesses of two times.

This unit also performs conflict preventing processing and by-pass processing from the store operand to the fetch operand in the case where the operand to be pre-fetched and the operand to be stored are superposed.

(3) "Pipeline Processing Mechanism"

Figure 27:
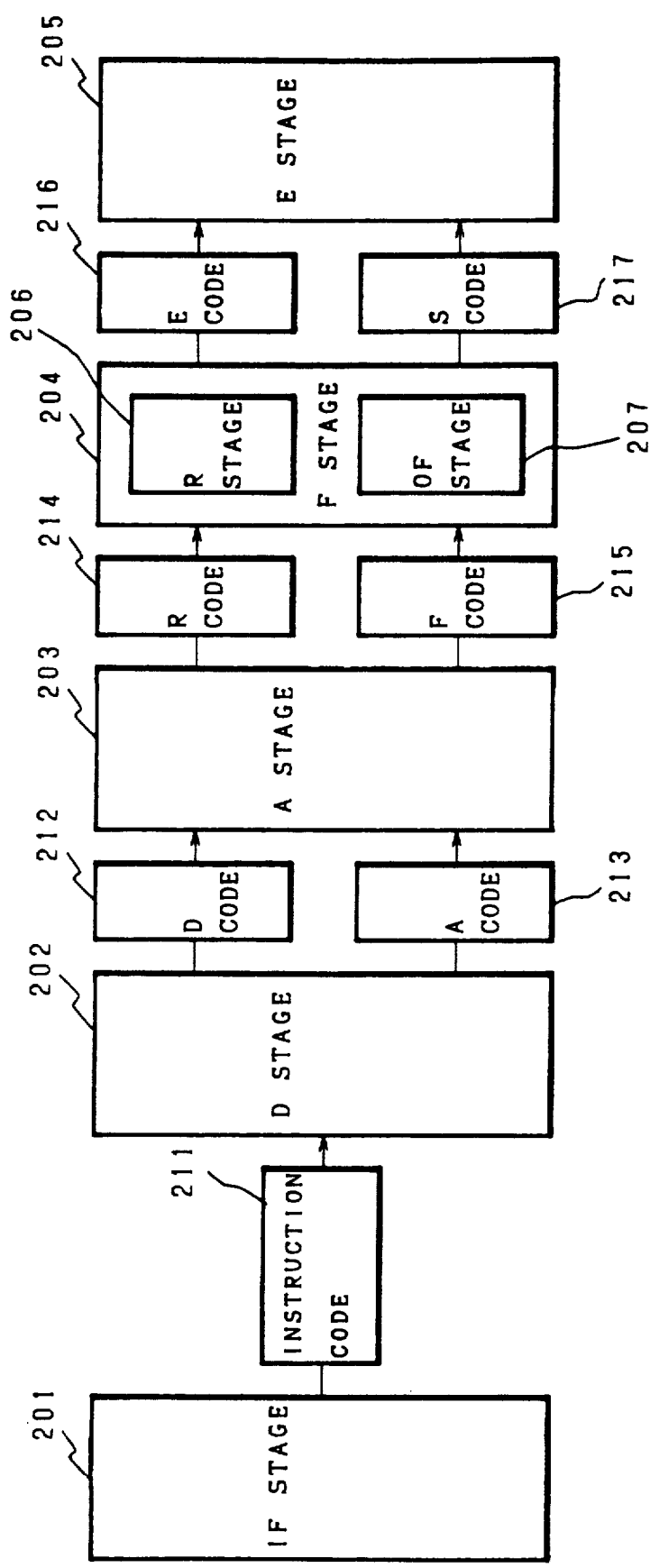
FIG. 27 is a block diagram showing a configuration of a pipeline function of the data processor of the present invention.

FIG. 27 is a schematic diagram showing a pipeline processing mechanism of the data processor of the present invention.

The basis of pipeline processing has a five-stage configuration which comprises an instruction fetch stage (IF stage) 201 for prefetching an instruction, a decoding stage (D stage) 202 for decoding the instruction, an operand address calculation stage (A stage) 203 for performing address calculation of an operand, an operand fetch stage (F stage) 204 consisting of a portion for performing micro ROM access (particularly called a R stage 206) and a portion for prefetch an operand (particularly called an OF stage 207), and an execution stage (E stage) 205 for executing an instruction.

The E stage 205 comprises a one-stage store buffer, and besides, in part of high-function instructions, the execution itself of the instruction is performed in a pipeline manner, and therefore, an actual effect of pipeline processing of five or more stages is obtainable.

Each stage operates independently from the other stages, and theoretically the five stages make perfectly independent operations. Each stage can perform one-time processing in a minimum of two clocks (one step). Accordingly, ideally, the pipeline processing progresses one after another on a two clock (one step) basis.

The data processor of the present invention comprises some instructions which cannot be processed only by the basic pipeline processing of one time such as an operation between memory and memory or a memory indirect addressing, but the data processor of the present invention is designed in such a manner that a balanced pipeline processing can be performed whenever possible for processing of these instructions. For the instructions having a plurality or memory operands, the pipeline processing is performed based on the number of memory operands by decomposing it into a plurality if pipeline processing units (step code) at the decoding stage.

On the decomposing method of the pipeline processing unit, detailed description is disclosed in the Japanese Patent Application Laid-Open No. 63-89932 (1988).

Information transferred from the IF stage 201 to the D stage 202 is an instruction code 211 itself. Information transferred from the D stage 202 to the A stage 203 includes two kinds of information, one on operation designated by an instruction (called a D code 212) and the other on address calculation of operand (called an A code 213).

Information transferred from the A stage 203 to the F stage 204 includes an R code 214 comprising an entry address of a microprogram or a parameter of the microprogram and an F code 215 comprising an operand address and information on directing the method of access.

Information transferred from the F stage 204 to the E stage 205 is an E code 216 comprising operation control information and literal and an S code 217 comprising an operand or an operand address.

EIT detected in the stage other than the E stage 205 does not start the EIT processing until the code thereof reaches the E stage 205. This is because only the instruction processed in the E stage 205 is an instruction at the step of execution, and the instructions having been processed between the IF stage 201 and the F stage 204 do not reach the step of execution yet. Accordingly, for the EIT detected in the stage other than the E stage 205, the detection thereof is recorded in the step code, and it is only transmitted to the following stage.

(3.1) "Pipeline Processing Unit"

(3.1.1) "Classification of Instruction Code Fields"

The pipeline processing unit of the data processor of the present invention is determined by utilizing the feature of the format of an instruction set.

As described in Section (1), the instruction of the data processor of the present invention is a variable-length instruction of two-byte unit, and basically the instruction is configurated by repeating one to three times "a two-byte instruction base part + an addressing extension part of 0 to 4 bytes".

In many cases, the instruction base part comprises an operation code part and an addressing mode designating part, and in the case where index addressing or memory indirect addressing is required, "a two-byte chained addressing mode designating part + an addressing extension part of 0 to 4 bytes" is affixed by an arbitrary number in place of the addressing extension part. The extension part of two or four bytes which is peculiar to the instruction is also affixed lastly depending on the instruction.

The instruction base part comprises an operation code of an instruction, a basic addressing mode, literal and the like. The addressing extension part is any one of displacement, an absolute address, an immediate value and displacement of branch instruction. The extension part peculiar to the instruction comprises a register map, an immediate value designating of the I-format instruction and the like.

Figure 28:
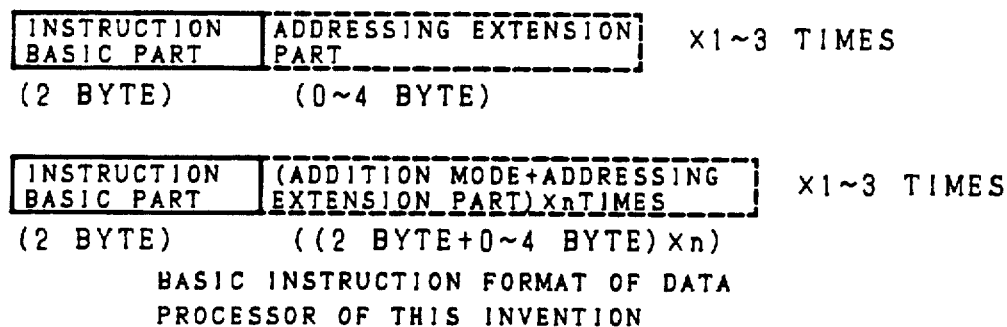
FIG. 28 is a schematic diagram showing a basic instruction format of the data processor of the present invention.

FIG. 28 is a schematic diagram showing the feature of the basic instruction format of the data processor of the present invention.

(3.1.2.) "Decomposition of Instruction into Step Codes"

The data processor of the present invention performs the pipeline processing making the most of the feature of the above-mentioned instruction format.

In the D stage 202, "a two-byte instruction base part + an addressing extension part of 0 to 4 bytes", "a chained addressing mode designating part + an addressing extension part", or an extension part peculiar to the instruction is processed as one decoding unit. The result of decoding of each time is called a step code, and in and after the A stage 203, this step code is taken as a unit of pipeline processing. The number of step codes is peculiar to each instruction, and in the case where the chained addressing mode designating is not performed, one instruction is divided into a minimum of one step code to a maximum of three step codes. In the case where the chained addressing mode designating is performed, the number of step codes is increased by a number as required. Note that this is performed only in the decoding step as described later.

(3.1.3) "Control of Program Counter"

All of the step codes existing on the pipeline of the data processor of the present invention have a possibility of being the ones for another instruction, and for this reason, the value of the program counter is controlled on a step code basis. All of the step codes have the program counter value of the instruction whereon that step code is based. The program counter value flowing through each stage of the pipeline while accompanying the step code is called a step program counter (SPC). The SPC is transferred sequentially from one pipeline stage to the other.

(3.2) "Processing of Each Pipeline Stage"

As shown in FIG. 27, for convenience sake, names are given to the input and output step codes of each pipeline stage. The step codes perform processing relating to the operation codes, and include two series; a series becoming entry addresses of microprograms and parameters for the E stage 205 and a series becoming operands for microinstructions of the E stage 205.

(3.2.1.) "Instruction Fetch Stage"

The instruction fetch stage (IF stage) 201 fetches an instruction from the memory or the branch buffer and input it to the instruction queue 301, and outputs an instruction code to the D stage 202. Input of the instruction queue 301 is performed in an aligned four-byte unit. In the case where an instruction is fetched from the memory, a minimum of two clocks (one step) are required for the aligned four bytes. In the case where the branch buffer hits, fetching can be made in one clock per aligned four bytes. The output unit of the instruction queue 301 is variable on a two-byte basis, and a maximum of six bytes can be outputted during two clocks. Immediately after a branch, two bytes of the instruction base part can also be transferred directly to the instruction decoder by by-passing the instruction queue 301.

Control of registering, clearing and the like of the instruction to the branch buffer, management of addresses of the instructions to be prefetched and control of the instruction queue are also performed in the IF stage 201.

The EITs detected in the IF stage 201 include a bus access exception in fetching an instruction from the memory or an address conversion exception due to memory protection violation.

(3.2.2) "Instruction Decoding Stage"

The instruction decoding stage (D stage) 202 decodes an instruction code inputted from the IF stage 201. Decoding is performed by two clock (one step) basis using the first decoder 303 consisting of the FHW decoder, the NFHW decoder and the addressing mode decoder in the instruction decoding unit 102, and an instruction code of 0 to 6 bytes is consumed in the decoding processing of one-time (no instruction code is consumed in the outputting processing of the step code comprising the return address of the RET instruction). By one-time decoding, the control code which is the A code 213 as address calculation information, address modification information, the control code which is the D code 212 as the result of intermediate decoding of the operation code, and eight-bit literal information are inputted to the A stage 203.

In the D stage 202, control of the PC calculation unit 103 of each instruction, branch prediction processing, prebranch processing for the pre-branch instruction and outputting processing of the instruction code from the instruction queue 301 are also performed.

The EITs detected in the D stage 202 include a reserve instruction exception and an odd address jump trap at pre-branch. Various EITs transferred from the IF stage 201 are also transferred to the A stage 203 through processing of encoding into the step code.

(3.2.3) "Operand Address Calculation Stage"

Processing functions of the operand address calculation stage (A stage) are roughly divided into two parts.

One is processing for post-decoding of the operation code using the second decoder 305 of the instruction decoding unit 102 and the other is for calculation of operand address in the operand address calculation unit 104.

The post-decoding processing of the operation code inputs the D code 212 and outputs the R code 214 comprising write reserve of register and memory, entry address of microprogram and parameters for microprogram. In addition, the write reserve of the register or memory is for preventing a wrong address calculation by re-writing the content of the register or memory referred in the address calculation with the instruction preceding on the pipeline.

To avoid a dead lock, the write reserve of the register or memory is performed on an instruction basis rather than on a step code basis.

On the write reserve to the register or memory, detailed description is disclosed in the Japanese Patent Application No. 62-144394 (1987).

The operand address calculation processing inputs the A code 213, performs addition in the operand address calculation unit 104 according to the A code 213 or performs address calculation by combining memory indirect reference, and outputs the result of the calculation as the F code 215. At this time, conflict check is done in reading-out of the register and the memory attending on the address calculation, and if a conflict is indicated because the preceding instruction has not completed the writing processing to the register or the memory, the processing waits until the preceding instruction completes the write processing in the E stage 205. Checking is made for whether or not the operand address and the address of memory indirect reference can enter the I/O area mapped in the memory.

The EITs detected in the A stage 203 include reserve instruction exception, privilege instruction exception, bus access exception, address conversion exception and debugging trap generated by an operand break point hit at memory indirect addressing. When it is indicated that the D code 212 or the A code 213 itself has caused EIT, the A stage 203 does not perform address calculation processing for that code, and that EI is transmitted to the R code 214 and the F code 215.

(3.2.4) "Micro ROM Access Stage"

Processing of the operand fetch stage (F stage) 204 is also divided roughly into two parts. One is access processing of the micro ROM, particularly called the R stage 206. The other is operand prefetch processing, particularly called the OF stage 207. The R stage 206 and the OF stage 207, which do not necessarily operate at the same time, operate independently depending on whether or not the memory access right can be acquired.

The micro ROM access processing which is the processing of the R stage 206 is the micro ROM access and micro instruction decoding processing for generating the E code 216 which is an execute control code used for execution in the following E stage 205 for the R code 214. In the case where processing for one R code 214 is decomposed into two or more microprogram steps, the micro ROM is used in the E stage 205, and the following R code 214 waits for micro ROM access. The micro ROM access to the R code 214 is performed when the last micro instruction is executed in the preceding E stage 205. In the data processor of the present invention, almost all of the basic instructions are executed in one microprogram step, therefore, there are many actual cases that the micro ROM access to the R code 214 is performed one after another.

There is no EIT to be detected anew in the R stage 206.

When the R code 214 indicates the EIT of instruction processing re-execution type, the microprogram for that EIT processing is executed, and therefore the R stage 206 fetches the micro instruction according to the R code 214. In case where the R code 214 indicates an odd address jump trap, the R stage 206 transmits it through the E code 216. This is for pre-branch, and in the E stage 205, if no branch is made in that E code 216, an odd address jump trap is generated with the pre-branch being to be effective.

(3.2.5) "Operand Fetch Stage"

The operand fetch stage (OF stage) 207 performs the operand prefetch processing among the above-mentioned two processings performed in the F stage 204.

The operand prefetch processing inputs the F code 215 and outputs the fetched operand and the address thereof as the S code 217. One F code 215 may stride over the word boundary, but designates operand fetching of four bytes or less. The F code 215 also comprises designating of whether or not access to the operand is to be performed, and in the case where the operand address itself or the immediate value calculated in the A stage 203 is transferred to the E stage 205, no operand prefetch is performed, and the content of the F code 215 is transferred as the S code 217. In the case where the operand intended to be prefetched coincides with the operand intended to be write-processed in the E stage 205, no operand prefetching is performed from the memory, but being performed by by-passing it. For the I/O area, the operand prefetch is delayed, and the operand fetch is performed only after all the preceding instructions have been completed.

The EITs detected in the OF stage 207 include a bus access exception, an address conversion exception, and a debugging trap generated by a break point hit to the operand prefetch. When the F code 215 indicates an EIT other than the debugging trap, it is transferred to the S code 217, and no operand prefetch is performed. When the F code 215 indicates a debugging trap, the same processing as the case where no EIF is indicated for that F code 215 is performed, and the debugging trap is transmitted to the S code 217.

(3.2.6) "Execution Stage"

The execution stage (E stage) 205 operates with the E code 216 and the S code 217 taken as inputs. This E stage 205 is a stage for executing instructions, and the whole processings performed in the stages before and in the F stage 204 are pre-processings for the E stage 205. In the case where a jump instruction is executed in the E stage 205 or the EIT processing is started, all the processings from the IF stage 201 to the F stage 204 are disabled. The E stage 205 is controlled by microprograms, and the instruction is executed by executing a series of microprograms starting with the entry address of microprogram indicated in the R code 214.

Read of the micro ROM and execution of the microinstruction are performed in a pipeline manner. Accordingly, in the case where a branch takes place in the microprogram, a gap (blank) of one microstep is generated. The E stage 205 can also perform pipeline processing of an operand store of four bytes or less and the following microinstruction execution by utilizing the store buffer in the data operation unit 106.

In the E stage 205, the write reserve to the register and the memory performed in the A stage 203 is released after write of the operand.

In the case where a conditional branch instruction generates a branch in the E stage 205, the branch prediction for that conditional branch instruction has been wrong, and therefore rewriting of the branch history is performed.

The EITs detected in the E stage 205 include bus access exception, address conversion exception, debugging trap, odd address jump trap, reserve function exception, wrong operand exception, reserve stack format exception, zero division trap, unconditional trap, conditional trap, delayed context trap, external interruption, delayed interruption, reset interruption and system faults.

The EITs detected in the E stage 205 are all EIT-processed, but the EITs which are detected between the IF stage 201 and the F stage 204 before the E stage and are reflected in the R code 214 or the S code 217 are not necessarily EIT-processed. All the EITs which are detected among from the IF stage 201 to the F stage 204, but do not reach the E stage 205 because the preceding instruction has executed a jump instruction in the E stage 205 or the like are all canceled. The instruction having caused that EIT is assumed to have not been executed from the beginning.

The external interruption and the delayed interruption are accepted directly to the E stage 205 at a pause of the instruction, and necessary processing is executed by microprograms. Processings of other various EITS are performed by microprograms.

(3.3) "Status Control of Each Pipeline Stage"

Each stage of the pipeline has an input latch and an output latch, and is based on operation independent of other stages. Each stage starts the next processing after such whole processes as the one-preceding processing has been completed, the result of that processing has been transferred from the output latch to the input latch of the next stage, and all input signals required for the next processing have been prepared in the input latch of the stage of its own.

This means that each stage starts the next processing after such whole processes as all the input signals to the next processing outputted from the one-preceding stage are enabled, the result of the current processing is transferred to the input latch of the post-stage, and the output latch becomes empty.

It is required that all input signals are prepared at a timing with one clock before the operation start in each stage. If the input signals are not all prepared, that stage is put in the waiting state (input waiting). If transfer from the output latch to the input latch of the next stage is done, it is required that the input latch of the next stage is in the empty state, and when the input latch of the next stage is not empty, the pipeline stage is also put in the waiting state (output waiting). If the required memory access right cannot be acquired, or wait is inserted into the memory access under processing, or another pipeline conflict occurs, the processing itself of each stage is delayed.

(4) "Processing Sequence of POP Instruction"

For the data processor as described above, further detailed description is made on how the POP instruction is processed on the pipeline in the cases where destination is memory-designated and register-designated in reference to drawings.

Figure 29:
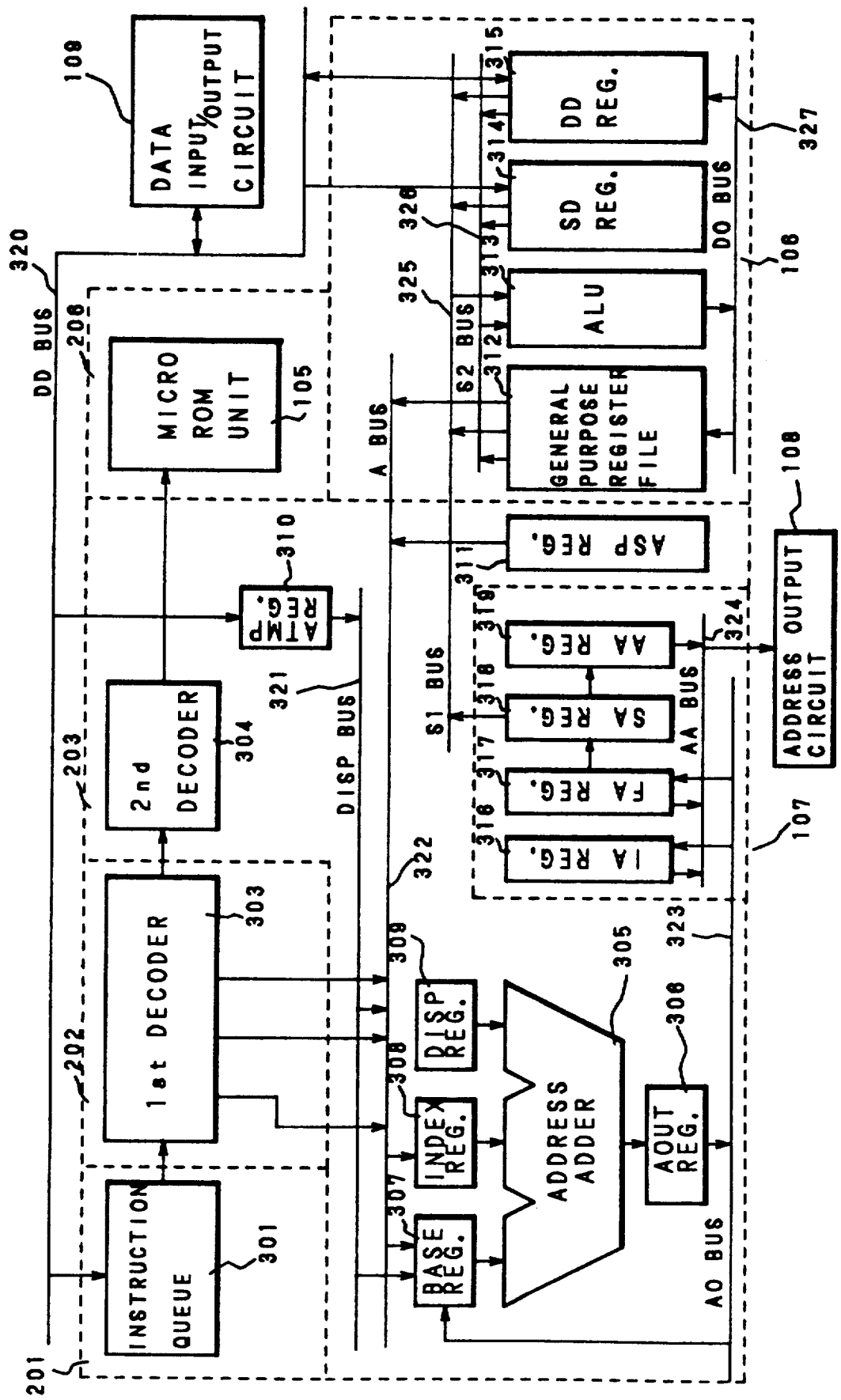
FIG. 29 is a block diagram showing a further detailed configuration of the data processor of the present invention.

FIG. 29 is a block diagram showing a further detailed configuration of the data processor of the present invention.

The instruction queue 301 is comprised in the instruction fetch unit 101, and relates to the processing of the IF stage 201.

The first decoder 303 is located in the instruction decoding unit 102, and relates to the processing of the D stage 202.

The second decoder 304 and an ATMP register 310 are located in the instruction decoding unit 102, and relates to the processing of the A stage 203. The ATMP register 310 is used for retaining the data read by memory access at memory indirect reference.

The address adder 305, an AOUT register 306, a BASE register 307, an INDEX register 308 and a DISP register 309 are comprised in the operand address calculation unit 104, and relate to the processing of the A stage 203. The BASE register 307, the INDEX register 308 and the DISP register 309 are registers for retaining the base value, the index value and the displacement value, respectively. The address adder 305 simultaneously adds the values of the BASE register 307, the INDEX register 308 and the DISP register 309. The AOUT register 306 is a register for retaining the output of the address adder 305. An ASP register 311 is comprised in a stack pointer calculation unit, and relates to the processing of the A stage 203.

In order to prevent a conflict of SP value due to a POP operation from the stack or a PUSH operation to the stack and the like, in the A stage 203, there is controlled the ASP value which is the SP value of the A stage preceding the SP value of the E stage 205. Renewal of the SP value attending on the POP operation and the PUSH operation is performed by controlling the ASP value in the A stage. Accordingly, by referring to the ASP value processing can be made to progress without generating a delay of processing the step code caused by a conflict of SP value even immediately after normal POP operation or PUSH operation. The ASP register 311 does retain this ASP value.

In addition, on the method of controlling the SP value, detailed disclosure is made in the Japanese Patent Application No. 62-145852 (1987).

The micro ROM unit 105 comprising a micro ROM, a micro sequencer, a microinstruction decoder and the like relates to the processing of the R stage 206.

A general-purpose register file 312, an ALU 313, an SD register 314, and a DD register 315 are comprised in the data operation unit 106, and relate to the processings of the OF stage 207 and the E stage 205. The SD register 314 is a register for retaining the data read by memory access at operand fetching. The DD register 315 is a register for retaining the data to be read or stored for the E stage 205 by memory access.

An IA register 316, an FA register 317, an SA register 318 and an AA register 319 are part of the external bus interface unit 107. The IA register 316 is a register for setting the address when the A stage 208 performs memory access at memory indirect reference. The FA register 317 is a register for setting the address when the OF stage 207 performs memory access at fetching of the operand. The AA register 319 is a register for setting the address when the E stage 205 reads or stores data by memory access.

The OF stage 207 sends the operand-fetched data and the address thereof to the E stage 205, and the SA register 318 retains the address to be sent at that time. The SA register 318 not only sends the address but also is used in the case of sending the immediate value.

In addition, buses of the data processor of the present invention include a DD bus 320, a DISP bus 321, an A bus 322, and an AO bus 323, an AA bus 324, an S1 bus 325, an S2 bus 326 and a DO bus 327.

Figure 30:
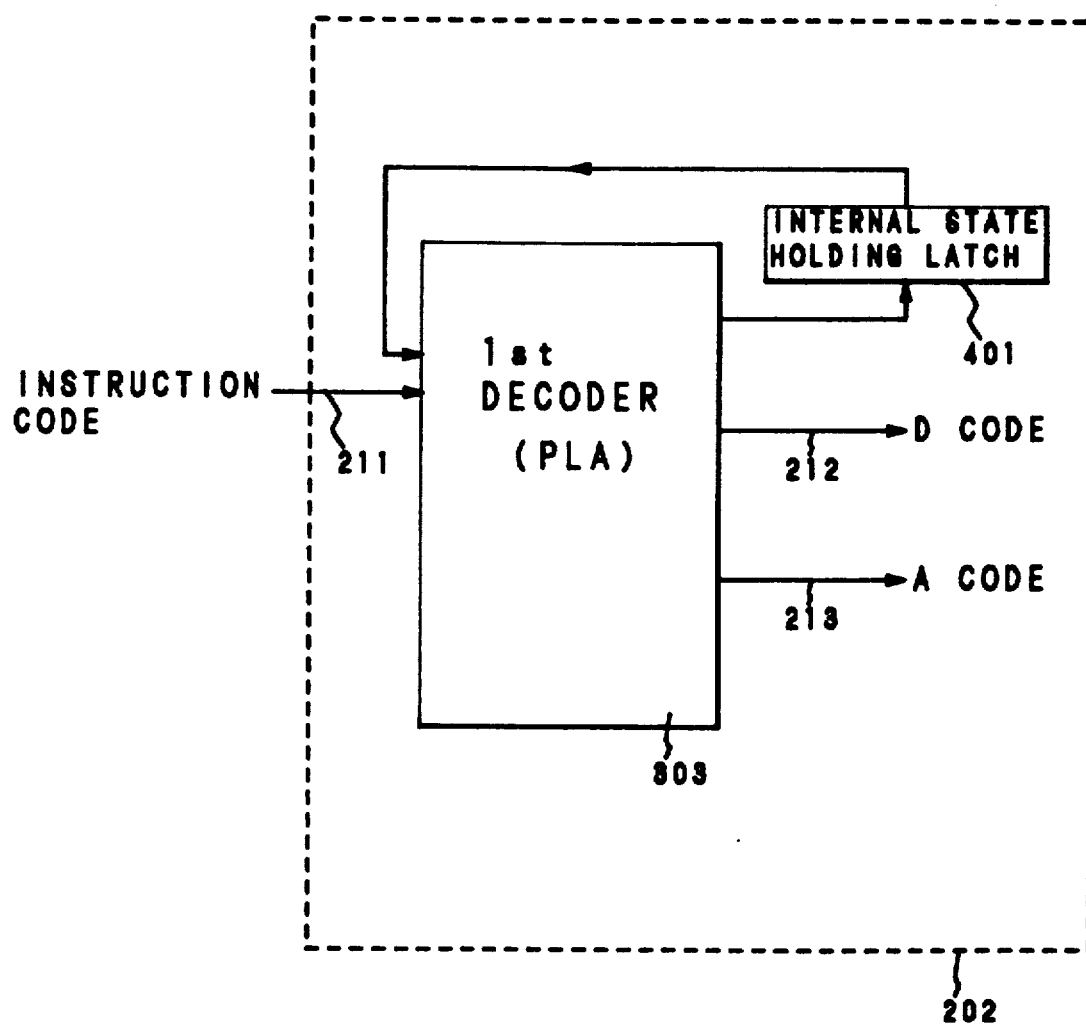
FIG. 30 is a block diagram showing a configuration of a decoding (D) stage of the data processor of the present invention.

FIG. 30 is a block diagram showing a simplified configuration of the D stage 202.

As described above, the D stage 202 is mainly configurated with the first decoder 303. The first decoder 303 is configurated with a PLA (Programmable Logic Array). When the instruction code 211 is inputted to the D stage 202, it is decoded by the first decoder 303, and the D code 212 and the A code 213 are generated and outputted.

The D code 212 is given to the portion performing the processing of the A stage 203 in the instruction decoding unit 102, and the A code 213 is given to the portion performing the processing of the A stage 203 in the operand address calculation unit 104, respectively.

In addition, numeral 401 designates an inner state retaining latch.

Figure 31:
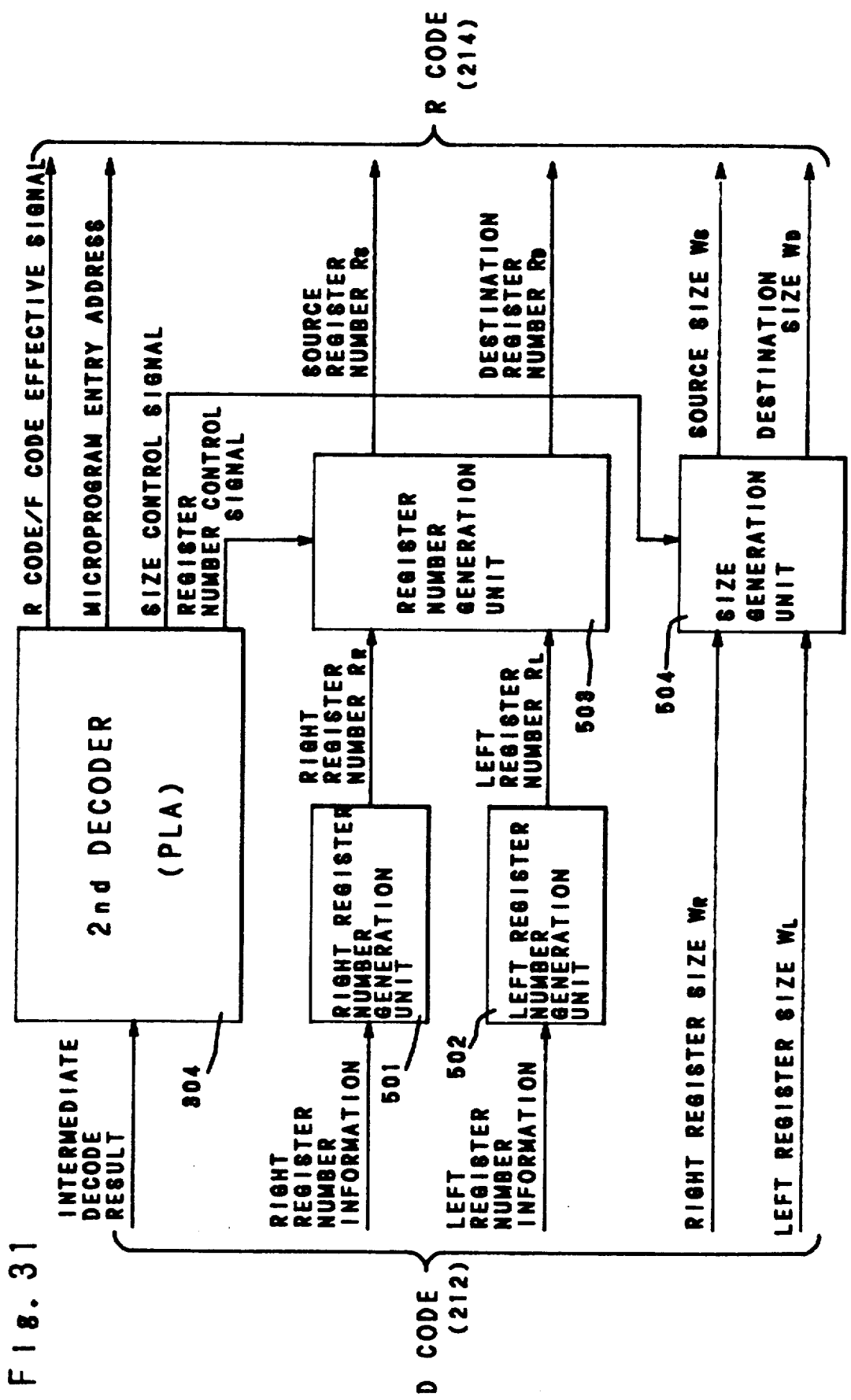
FIG. 31 is a block diagram showing a configuration of a portion which is an operand address calculation (A) stage and is comprised in an instruction decoding unit of the data processor of the present invention.

FIG. 31 is a block diagram showing a configuration of the portion performing the processing of the A stage 203 in the instruction decoding unit 102.

This portion is configurated with the second decoder 304, a right register number generating unit 501, a left register number generating unit 502, a register number generating unit 503, a size generating unit 504 and the like. In addition, the second decoder 304 is configurated with the PLA likewise the first decoder 303.

The D code 212 to be inputted is configurated with the result of intermediate decoding of the operation code, right register number information, left register number information, a right register size $W_R$, a left register size $W_L$ and the like.

The right register number information and the left register number information are inputted to the right register number generating unit 501 and the left register number generating unit 502, respectively, and generate a right register number $R_R$ and a left register number $R_L$, respectively. The right register number information comprises information showing that the operand is any one of a value in the register, a literal, a value in the memory and an immediate value. The left register number information comprises information showing that the operand is either a value in the register or a literal.

The right register number $R_R$ and the left register number $R_L$ correspond to a first register designating unit and a second register designating unit in the instruction format, respectively, and locations to store a first operand and a second operand are designated by those register numbers, respectively. For an example, the R-Format instruction as shown in FIG. 4 is given. Symbol Rn shows the first register designating unit corresponding to the right register number $R_R$, and symbol Rm shows the second register designating unit corresponding to the left register number $R_L$.

In the instruction format, it is not determined in one meaning that which of the first operand designating unit and the second operand designating unit is the source or the destination. For this reason, which of the right register number $R_R$ and the left register number $R_L$ becomes the source register number $R_S$ or the destination register number $R_D$ is determined by a register number control signal which is an output of the second decoder 304 in the register number generating unit 503.

In the size generating unit 504 having being given a size control signal which is an output of the second decoder 304, the right register size $W_R$ which is a data size of the register shown by the right register number $R_R$ and the left register size $W_L$ which is a data size of the register shown by the left register number $R_L$ are determined by the source size $W_S$ and the destination size $W_D$.

In the F stage 204, it is recognized by a R code/F code enable signal which is an output of the second decoder 304 that the R code 214 and the F code 215 have been transferred to the F stage 204.

Figure 32:
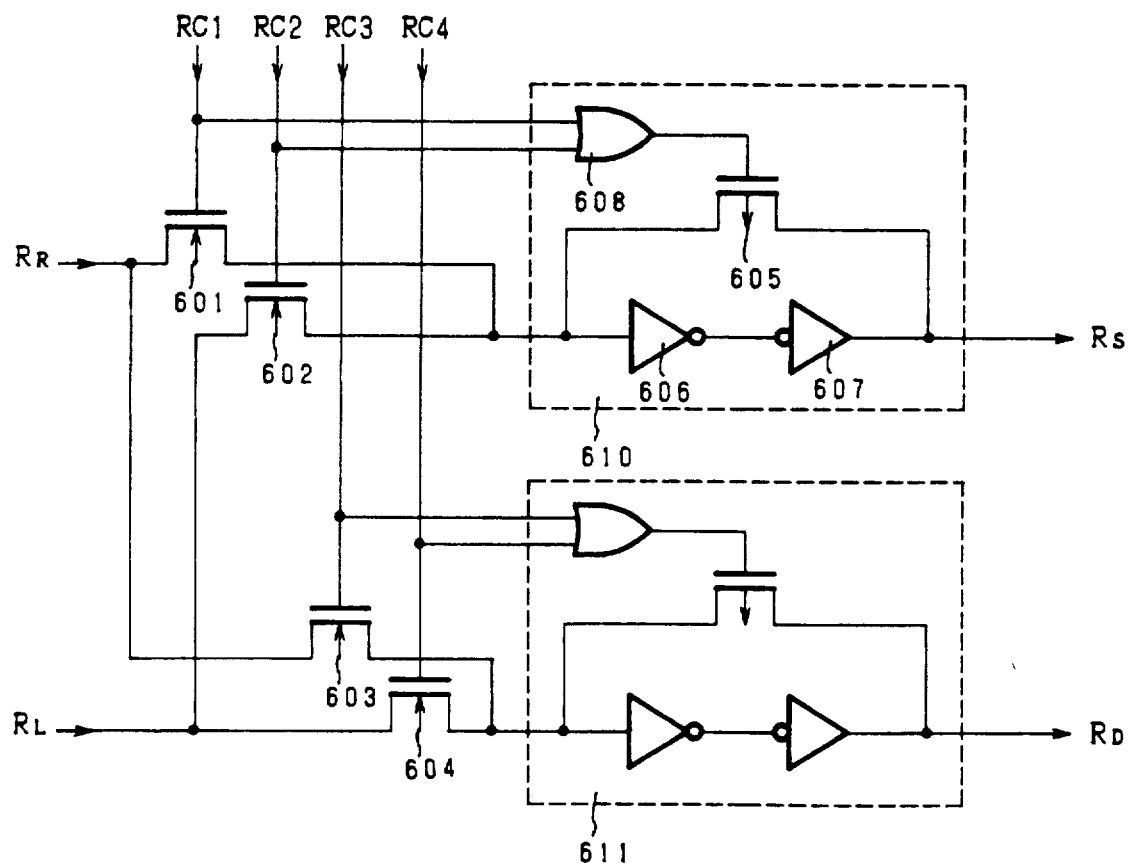
FIG. 32 is a circuit diagram showing a configuration of a register number generating unit FIG. 31.
Figure 33:
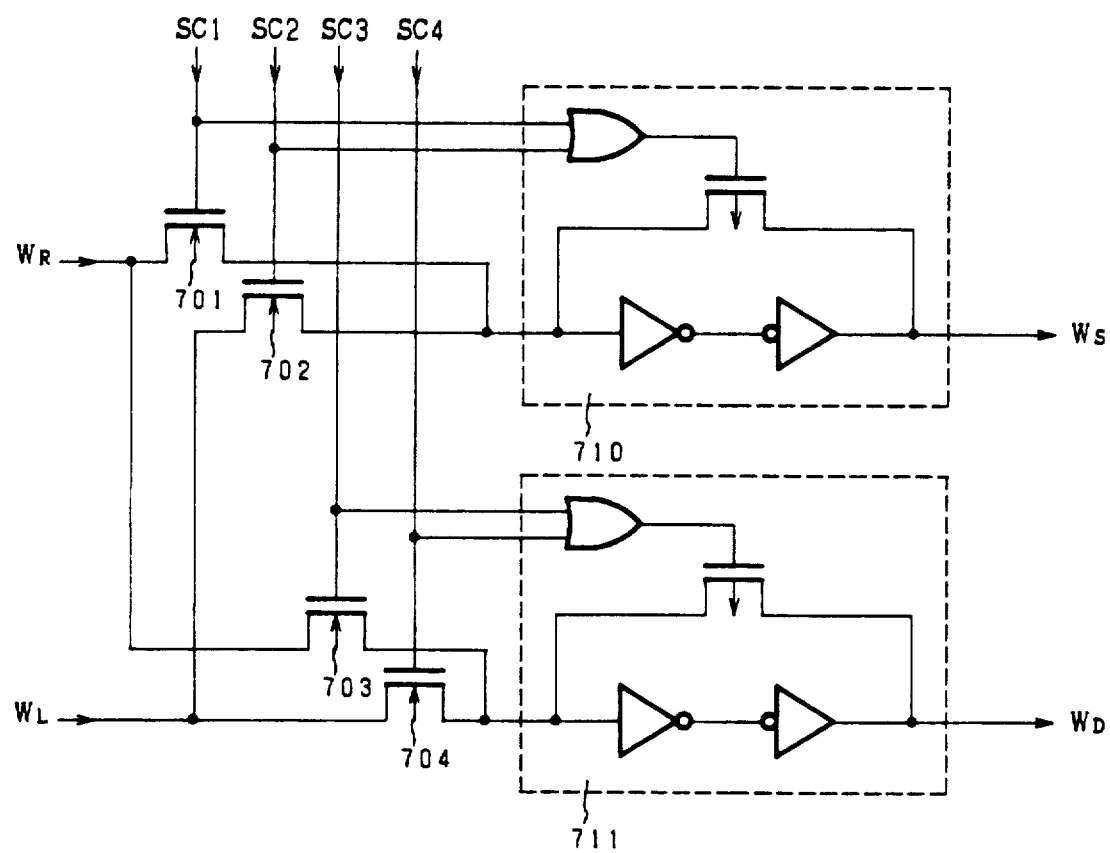
FIG. 33 is a circuit diagram showing a configuration of a size generating unit in FIG. 31.

FIG. 32 and FIG. 33 are circuit diagrams showing configurations of the register number generating unit 503 and the size generating unit 504, respectively.

Input signals RC1, RC2, RC3 and RC4 in FIG. 32 are register number control signals outputted by the second decoder 304. Input signals SC1, SC2, SC3 and SC4 in FIG. 33 are size control signals outputted by the second decoder 304.

Numerals 601, 602, 603, 604, 701, 702, 703 and 704 designate N-channel transmission gates (TG) respectively, numeral 605 designates a P-channel TG, numerals 606 and 607 designate inverters, and numeral 608 designates an OR gate. The respective circuits are configurated with a latch wherein an input gate is a selector. A circuit 610 is configurated with the P-channel TG 605, the inverter 606, the inverter 607 and the OR gate 608. Each circuit 611, 710 and 711 have configurations equivalent to the circuit 610.

In addition, in FIG. 32 and FIG. 33, circuits for one bit are shown to be simplified. However, the signal indicating the register number and the signal indicating the size are of five bits and two bits respectively, and actually each configuration is made with a circuit of a corresponding bit number.

FIG. 34 is a table showing the contents of the R code/F code output control signal, the register number control signal and the size control signal which are outputs of the second decoder 304 as shown in FIG. 31 in executing the POP instruction.

Figure 35A:
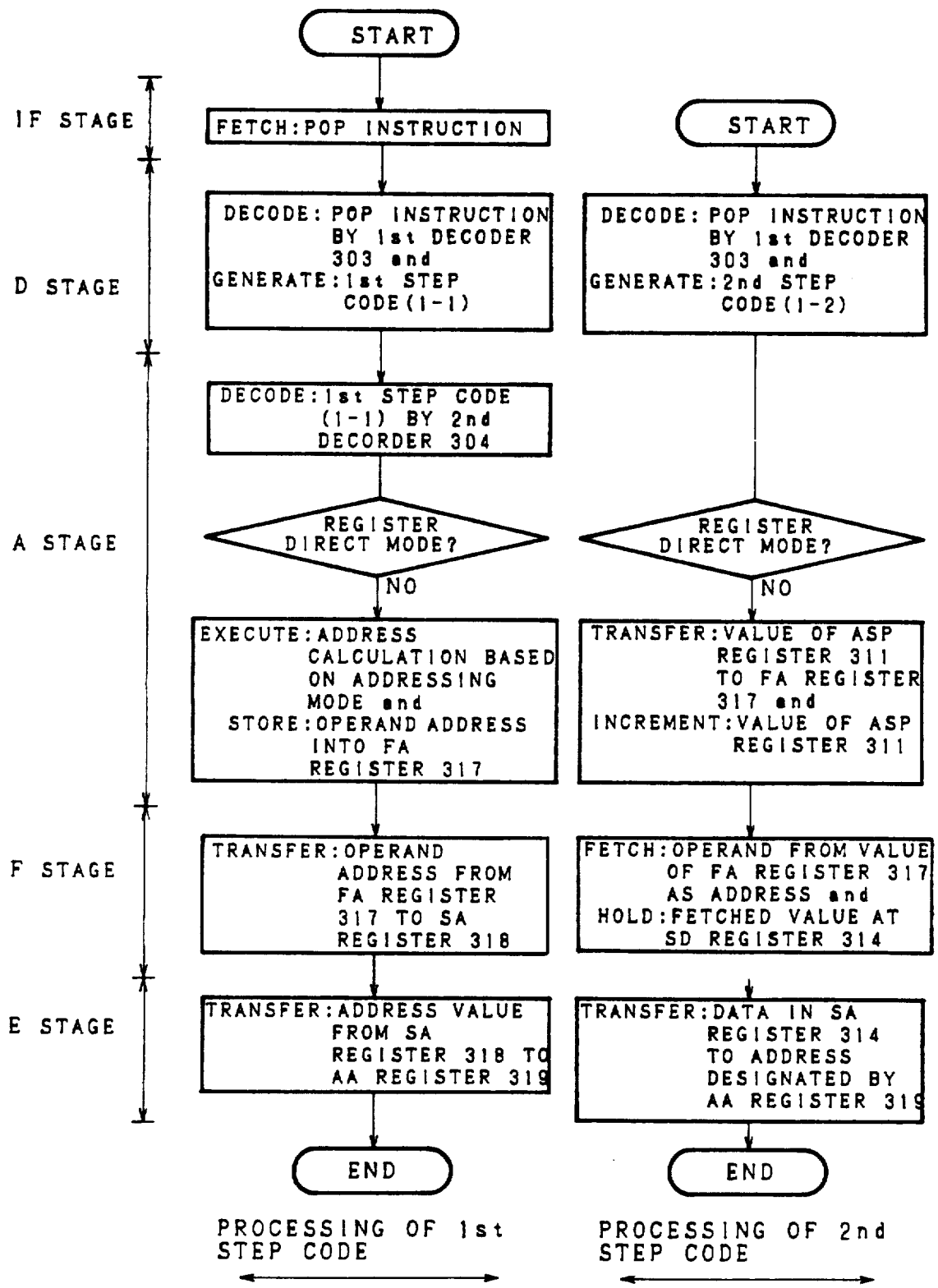
Figure 35B:
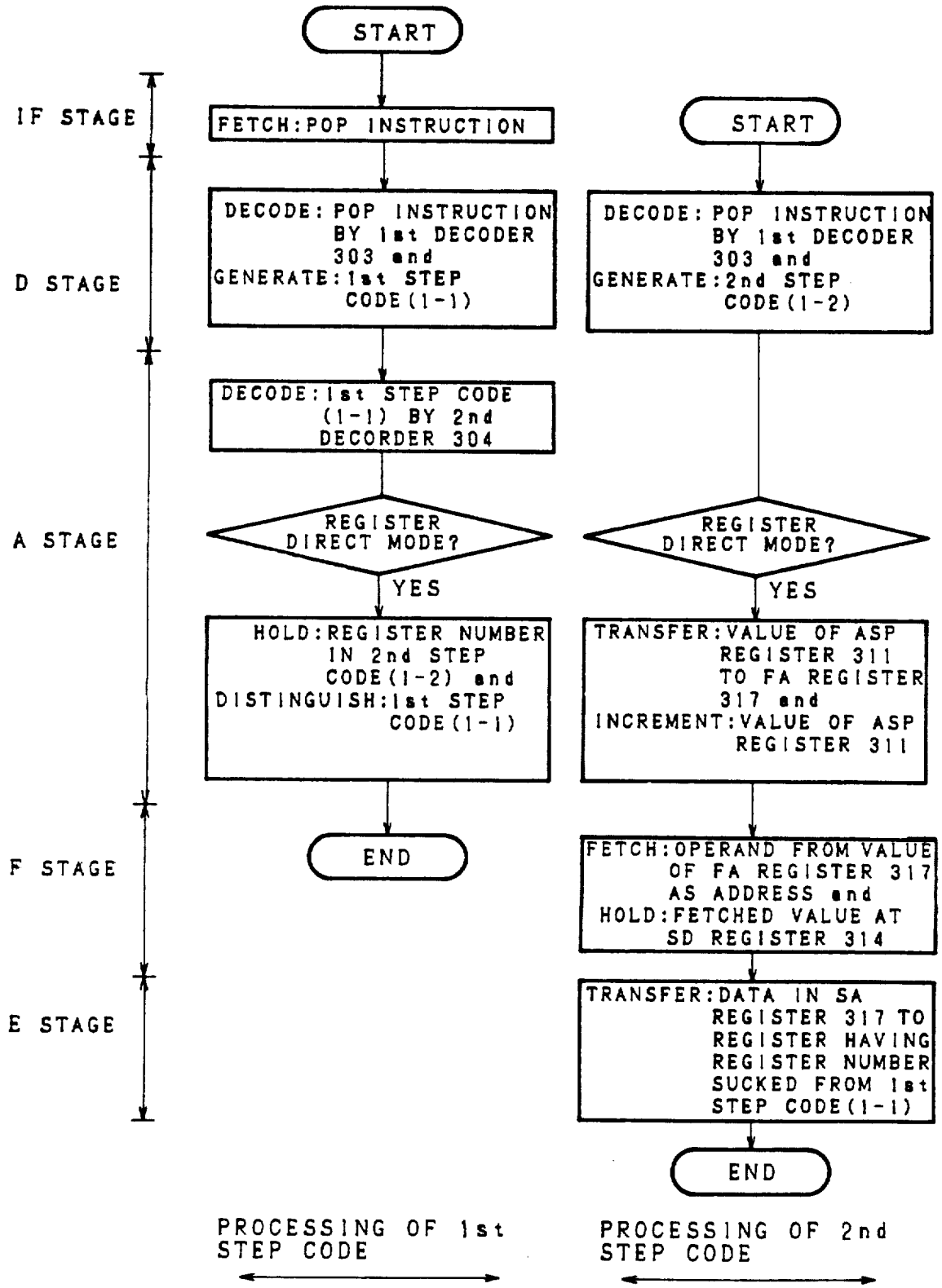

FIGS. 35(a) and (b) are flowcharts showing a processing sequence of the POP instruction on the pipeline. FIG. 35(a) is a flowchart wherein destination is memory-designated. FIG. 35(b) is a flowchart wherein destination is register-designated.

Figure 36A:
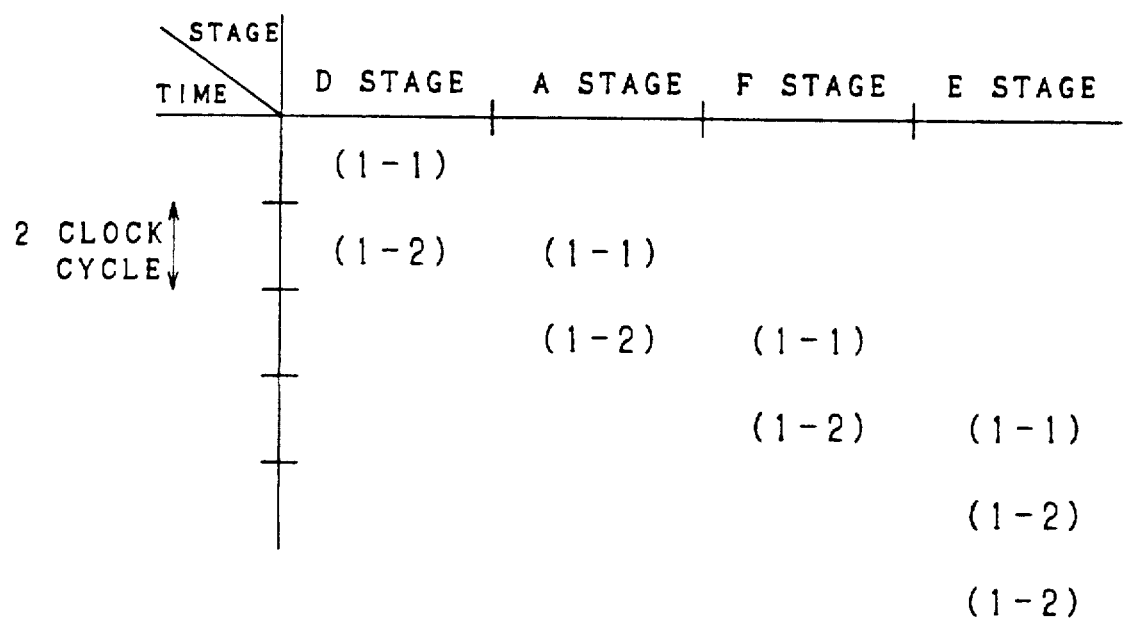
FIGS. 36(a), 36(b), 36(c) and 36(d) are schematic diagrams showing processing flows of step codes in stages in and after the D stage of the POP instruction.

FIGS. 36(a), (b), (c) and (d) are schematic diagrams showing flows of the step code processing in and after the D stage in processing the POP instruction. In the diagrams, the ordinate represents time and one division is equivalent to two clocks (one step).

FIGS. 36(a) and (b) show the cases where destination is memory-designated and register-designated respectively, and show flows of the step code processing in the case where no waiting state is present on the pipeline.

Figure 36B:
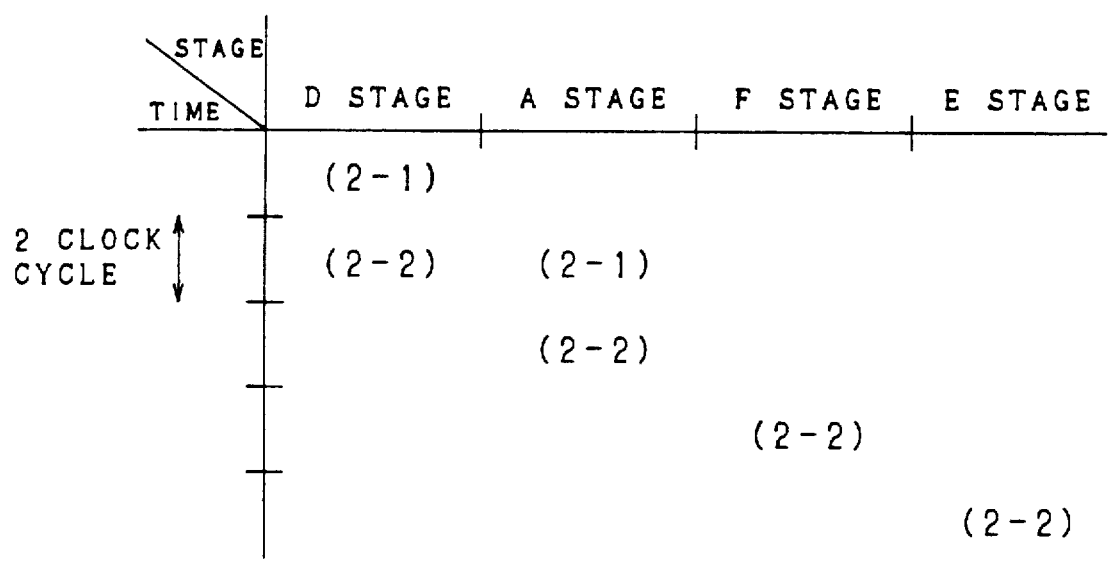
Figure 36C:
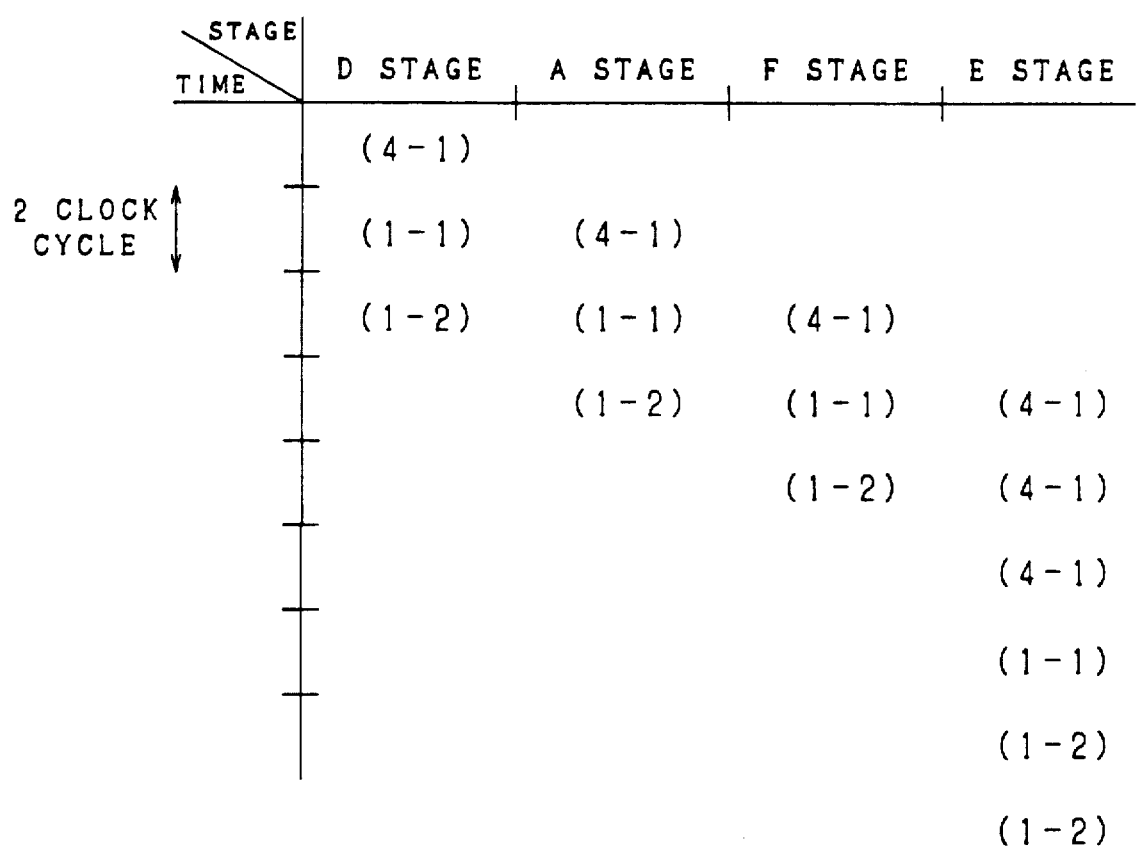

FIGS. 36(c) and (d) show the cases where destination is memory-designated and register-designated respectively, and show flows of the step code processing in the case where six clocks (three steps) is required in the E stage 205 for the step code processing immediately before the POP instruction, and consequently the waiting state has occurred in the step code of the POP instruction.

Figure 37A:
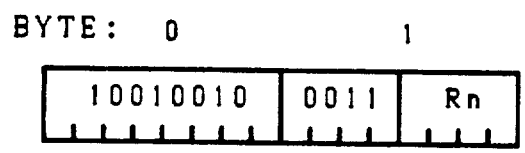
FIGS. 37(a) and 37(b) are schematic diagrams showing instruction formats of the POP instruction.
Figure 37B:
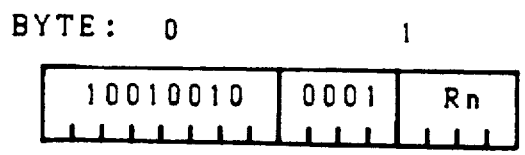

FIGS. 37(a) and (b) are schematic diagrams showing instruction formats of the POP instruction. The instruction format of the POP instruction is the G1-Format as shown in FIG. 7. FIG. 37(a) shows the case of register indirect addressing. The general-purpose register number Rn designated here shows the general-purpose register to be referred. FIG. 37(b) shows the case of register direct addressing. The general-purpose register number Rn designated here shows the general-purpose register to become destination.

Since the POP instruction is an instruction transferring data on the stack top to the memory or the register, it is virtually equal to the transfer instruction between memory and register or between memory and memory. Then, in the data processor of the present invention, configuration is made in a manner that the step code for processing the source operand part is generated despite the absence of the source operand designated part, and all the required preprocessings are performed before the E stage.

Hereinafter, description is made in reference to the flowcharts in FIGS. 35(a) and (b).

(4.1) "Where Memory is designated as Destination"

First, the IF stage 201 fetches the POP instruction from the memory and inputs it to the instruction queue 301, and outputs the instruction code 211 of the POP instruction to the D stage 202.

The D stage decodes the POP instruction fetched in the IF stage 201 by the first decoder 303.

The instruction code 211 of the POP instruction is inputted to the first decoder 303 and is decoded, and a first step code (1-1) of the POP instruction is generated. Part of the results of the decoding is retained in an inner state retaining latch 401 as an inner state signal.

In the next decoding cycle, in response to the inner state signal from the inner state retaining latch 401, the first decoder 303 generates a second step code (1-2) of the POP instruction without taking-in the instruction code 211 from the IF stage 201. Thus, the two step codes are generated as shown in FIG. 35(a).

Although no source operand designating part is present in the POP instruction, it is implied that the source operand is a stack top as a function of the instruction. Accordingly, in the data processor of the present invention, in the stage where the POP instruction has been decoded, a step code (1-2) for preliminarily performing the processing relating to the source operand is generated.

Each step code outputted from the D stage 202 is configurated with the A code 213 and the D code 212. The A code 213 and the D code 212 in the same step code are simultaneously sent to the A stage 203. The step codes generated from the POP instruction are sent to the A stage 203 in the sequence of the step code (1-1) and the step code (1-2).

Processings in the following stages are described relating to each step code.

(4.1.1) "Processing of the First Step Code (1-1) of POP Instruction"

The A stage 203 inputs the A code 213 and the D code 212.

When the A code 213 is inputted to the A stage 203, in the A stage 203, address calculation is performed by controlling a control signal of the A code 213. By information of the register to be referred, the value in the general-purpose register to be referred in the general-purpose register file 312 is stored in the BASE register 307 from the A bus 322. The INDEX register 308 and the DISP register 309 are cleared by a control signal included in the A code 213 of the step code (1-1). The values of these three registers are added by the address adder 305, and the result thereof is stored in the AOUT register 306. Furthermore, the value in the AOUT register 306 is sent to the FA register 317 through the AO bus 323. The value from the general-purpose register to be referred in the FA register 317 becomes the F code 215 together with part of the output of the second decoder 304.

As shown in FIG. 34, when the second decoder 304 inputs the result of intermediate decoding of the D code 212, it generates entry addresses of microprograms or various control information.

Also, the right register number information and the left register number information in the D code 212 are inputted respectively to the right register number generating unit 501 and the left register number generating unit 502, and the right register number $R_R$ and the left register number $R_L$ are generated. In the step code (1-1) of the POP instruction, only the right register number $R_R$ is valid, and indicates the SD register 318. The right register size $W_R$ indicates a word.

The control information outputted from the second decoder 304 comprises a register number control signal and a size control signal.

The register control signal indicates that the right register number $R_R$ corresponds to the destination register number $R_D$. The size control signal indicates that the right register size $W_R$ corresponds to the destination register size $W_D$.

Among the register number control signals RC1, RC2, RC3 and RC4, only the signal RC3 is enabled and only the N-channel TG 603 is turned on, and the right register number $R_R$ is retained as the destination register number $R_D$. Also, among the size control signals SC1, SC2, SC3 and SC4, only the SC3 is enabled, and only the N-channel TG 703 is turned on, and the right register size $W_R$ is retained as the destination register size $W_D$.

Thus, in the step code (1-1), the destination register number $R_D$ shows the SD register 318, and the destination register size $W_D$ shows a word.

The R code 214 is generated from these entry addresses of microprograms, the register number and the like.

The R code 214 and the F code thus generated are sent simultaneously to the F stage 204.

When the R code/F code enable signal is enabled, the R stage 206 inputs the R code 214, and accesses to the micro ROM 105 by the entry address of the microprogram comprised in the R code 214. Output of the micro ROM 105 is decoded, and becomes the E code 216 along with the register number and the like. The register shown by the destination register number $R_D$ of this E code 216 is the SD register 314, and the destination register size $W_D$ is a word.

When the R code/F code enable signal is enabled, the OF stage 207 inputs the F code 215, and the value in the FA register 317 which is part of the F code 215 is transferred to the SA register 318. The value in the SA register 318 is sent to the E stage 205 as the S code 217.

When the E code 216 and the S code 217 are inputted to the E stage 205, processing of "store the value in the SA register 318 into the AA register 319" is performed. In this case, the register shown by the destination register number $R_D$ is the SD register 314, but this value is invalid because of the write operand. Therefore, the value in the SA register 318 is only transferred to the AA register 319.

As described above, the step code (1-1) is processed in sequence on the pipeline.

(4.1.2) "Processing of the Second Step Code (1-2) of POP Instruction"

The A stage 203 inputs the A code 213 and the D code 212.

When the A code 213 is inputted to the A stage 203, in the A stage 203, address calculation is performed by control of a control signal in the A code 213. A value is outputted from the ASP register 311 which is a stack pointer of the A stage 203 to the A bus 322, and is stored in the BASE register 307. The INDEX register 308 and the DISP register 309 are cleared. The values of the BASE register 307, the INDEX register 308 and the DISP register 309 are added by the address adder 305, and the result thereof is stored in the AOUT register 306. By this operation, the content of the ASP register 311 is transferred to the AOUT register 306. Simultaneously, the ASP register 311 is incremented by +4. Furthermore, the value in the AOUT register 306 is transferred to the FA register 317 through the AO bus 323. The ASP value in the FA register 317 becomes the F code 215 along with part of the output of the second decoder 304.

When the result of intermediate decoding of the D code 212 is inputted, as shown in FIG. 34, the second decoder 304 generates entry addresses of microprograms and various control information.

Also, the right register number information and the left register number information in the D code 212 are inputted to the right register number generating unit 501 and the left register number generating unit 502 respectively, and the right register number $R_R$ and the left register number $R_L$ are generated. In the second step code (1-2) of the POP instruction, only the right register number $R_R$ is valid, and shows the SD register 514. The right register size $W_R$ shows a word.

This right register number information is not designated in the instruction format, but is generated in the D stage 202 when this step code (1-2) is generated.

The control information outputted by the second decoder 304 comprises the register number control information and the size control information. The register number control signal indicates that the right register number $R_R$ corresponds to the source register number $R_S$. The size control signal indicates that the right register size $W_R$ corresponds to the source register size $W_S$.

Among the register number control signals RC1, RC2, RC3 and RC4, only the signal RC1 is enabled, and only the N-channel TG 601 is turned on, and the right register number $R_R$ is retained as the source register number $R_S$. The destination register number $R_D$ is still the number retained at processing by the step code (1-1). Also, among the size control signals SC1, SC2, SC3 and SC4, only the signal SC1 is enabled, and only the N-channel TG 701 is turned on, and the right register size $W_R$ is retained as the source register size $W_S$.

Thus, in the step code (1-2), the source register number $R_S$ shows the SD register 314 and the source register size $W_S$ shows a word.

The R code 214 is generated from these entry addresses of the microprograms, register numbers and the like.

The R code 214 and the F code 215 thus generated are simultaneously sent to the F stage 204.

When the R code/F code enable signal is enabled, the R stage 206 inputs the R code 214, and accesses to the micro ROM 105 by the entry address of the microprogram comprised in the R code 214. An output of the micro ROM 105 is decoded to become the E code 216 along with the register number and the like. The register shown by the source register number $R_S$ of this step code (1-2) is the SD register 314, and the source register size $W_S$ is a word.

When the R code/F code enable signal is enabled, the OF stage 207 inputs the F code 215. The value of the FA register 317 which is part of the F code 215 is the SP value of this instruction. Then, pre-fetching of the operand is performed for the stack top through the external bus interface unit 107 with the value of the FA register 317 taken as an address value. In the access to this stack top, the prefetched value is read into the data processor of the present invention through the external bus interface unit 107, being retained in the SD register 314 from the DD bus 320.

The value in the SD register 314 is sent to the E stage 205 as part of the S code 217.

When the E code 216 and the S code 217 are inputted, the E stage 205 performs processing of "transfer the value in the register shown by the source register number $R_S$ with the value of the AA register 319 taken as the destination address". In this case, the register shown by the source register number $R_S$ is the SD register 314. Accordingly, the value in the SD register 314 prefetched from the stack top by the initial two clocks (one step) is sent from the S1 bus 325 to the ALU 313, and is transferred from the DO bus 327 to the DD register 315 without being operated.

Data sent to the DD register 315 by the next two clocks (one step) is stored through the external bus interface unit 107 with the value in the AA register 319 retained in the processing of the step code (1-1) taken as the destination address.

In the E stage 205, basically the second step code (1-2) of the ASP instruction necessitates four clocks (two steps) for processing. However, since operation and store of data are performed in a pipelined manner, there is the case where processing of the next instruction is sometimes started during storing processing of data, and in this case, only two clocks (one step) are required for processing.

As described above, the step code (1-2) is processed in sequence in the pipeline processing mechanism.

In the data processor of the present invention, as shown in FIG. 36(a), the step code (1-1) and the step code (1-2) of the POP instruction are processed in sequence in each stage of the pipeline. Accordingly, it is understood that dispersion of load to each stage is satisfactorily performed in processing the POP instruction.

(4.2) "Where Destination Is Designated as Register"

In the case where the addressing mode is the register direct mode, the processing relating to the destination operand can be simplified because the destination has become the general-purpose register.

Hereinafter, detailed description is made on how to simplify the processing relating to the destination operand in the case where the addressing mode of the POP instruction is the register direct mode.

In addition, the register number of the general-purpose register to become the destination here is assumed to be $R_J$. Accordingly, the general-purpose register number $R_n$ in FIG. 37(b) is $R_J$.

First, the IF stage 201 fetches the POP instruction from the memory and inputs it to the instruction queue 301, and outputs the instruction code 211 of the POP instruction to the D stage 202.

The D stage 202 decodes the POP instruction fetched by the IF stage 201 by the first decoder 303.

The instruction code 211 of the POP instruction is inputted to the first decoder 303 to be decoded, and the first step code (2-1) of the POP instruction is generated. Part of the result of decoding is retained in the inner state retaining latch 401 as an inner state signal.

In the next decoding cycle, in response to the inner state signal from the inner state retaining latch 401, the first decoder 303 does not take-in the instruction code 211 from the IF stage 201, and generates a second step code (2-2) of the POP instruction. Thus, as shown in FIG. 35(b), two step codes are generated.

No source operand designating part is comprised in the instruction, but it is implied that as a function of the instruction, the source operand is the stack top. In the data processor of the present invention, in the stage of decoding the POP instruction, the step code (2-2) for preliminarily performing the processing relating to the source operand is generated.

Each step code outputted from the D stage 202 is configured with the A code 213 and the D code 212. The A code 213 and the D code 212 comprised in the same step code are simultaneously sent to the A stage 203. The step codes generated from the POP instruction are sent to the A stage 203 in the sequence of the step code (2-1) and the step code (2-2).

For processing in the following stages, description is made on each step code.

(4.2.1) "Processing of the First Step Code (2-1) of POP Instruction"

The A stage 203 inputs the A code 213 and the D code 212. However, even if the A code 213 is inputted to the A stage 203, processing of address calculation is not performed because of the register direct mode.

As shown in FIG. 34, when the result of intermediate decoding of the D code 212 is inputted, the second decoder 304 generates the entry address of the microprogram and various control information.

The right register number information and the left register number information in the D code 212 are inputted to the right register number generating unit 501 and the left register number generating unit 502 respectively, and the right register number $R_R$ and the left register number $R_L$ are generated. In the step code (2-1) of the POP instruction, only the right register number $R_R$ is valid, and indicates the general-purpose register RI comprised in the general-purpose register file, and the right register size $W_R$ indicates a word.

The control information outputted from the second decoder 304 comprises the register number control information and the size control information. The register number control signal indicates that the right register number $R_R$ corresponds to the destination register number $R_D$. The size control signal indicates that the right register size $W_R$ corresponds to the destination register size $W_D$.

Among the register number control signals RC1, RC2, RC3 and RC4, only the signal RC3 is enabled, and only the N-channel TG 603 is turned on, and the right register number $R_R$ is retained as the destination register number $R_D$. Among the size control signals SC1, SC2, SC3 and SC4, only the signal SC3 is enabled, and only the N-channel TG 703 is turned on, and the right register size $W_R$ is retained as the destination register size $W_D$.

As described above, in the step code (2-1), the destination register number $R_D$ shows the general-purpose register RI, and the destination register size $W_D$ shows a word.

Since the addressing mode is of register direct addressing, the second decoder 304 does not enable the R code/F code enable signal. Accordingly, the F stage 204 does not input the step code (2-1). This means that the step code (2-1) disappears in the A stage 203.

The destination register number $R_D$ and the destination register size $W_D$ continue to be retained in order to be delivered to the step code (2-2).

In the case of an addressing mode other than the register direct mode, the step code (2-1) for performing the processing relating to the destination operand performs processing of retreating the destination address value into the AA register 219 in the E stage 205. However, that processing is unnecessary to be performed because of the register direct mode. Accordingly, in the data processor of the present invention, in the case of processing the POP instruction wherein the addressing mode is the register direct mode, the step code (2-1) is extinguished.

(4.2.2) "Processing of the Second Step Code (2-2) of POP Instruction"

The A stage 203 inputs the A code 213 and the D code 212. When the A code 213 is inputted to the A stage 203, in the A stage 203, address calculation is performed by control of a control signal in the A code 213. That value is outputted to the A bus 322 from the ASP register 311 which is the stack pointer of the A stage 203, being stored in the BASE register 307. The INDEX register 308 and the DISP register 309 are cleared. The values of the BASE register 307, the INDEX register 308 and the DISP register 309 are added with the address adder 305, and the result thereof is stored in the AOUT register 306. By this operation, the content of the ASP register 311 is transferred to the AOUT register 306. At the same time, the ASP register 311 is incremented by +4. Furthermore, the value in the AOUT register 306 is sent to the FA register 317 through the AO bus 323. The ASP value in the FA register 317 becomes the F code 215 along with part of the output of the second decoder 304.

As shown in FIG. 34, when the result of intermediate decoding of the D code 212 is inputted, the second decoder 304 generates the entry address of the microprogram and various control information.

The right register number information and the left register number information in the D code 212 are inputted to the right register number generating unit 501 and the left register number generating unit 502 respectively, and the right register number $R_R$ and the left register number $R_L$ are generated. In the step code (2-2) of the POP instruction, only the right register number $R_R$ is valid and shows the SD register 314. The register size $W_R$ shows a word. The right register number information of this step code (2-2) is not designated in the instruction format, but is generated in the D stage 202 in generating this step code (2-2).

The control information outputted from the second decoder 304 comprises the register number control information and the size control information. The register number control signal indicates that the right register number $R_R$ corresponds to the source register number $R_S$, and the size control signal indicates that the right register size $W_R$ corresponds to the source register size $W_S$.

Among the register number control signals RC1, RC2, RC3 and RC4, only the signal RC1 is enabled, and only the N-channel TG 601 is turned on, and the right register number $R_R$ is retained as the source register number $R_S$. The destination register number $R_D$ is still the number retained at the processing by the step code (2-1). Among the size control signals SC1, SC2, SC3 and SC4, only the signal SC1 is enabled, and only the N-channel TG 701 is turned on, and the right register size $W_R$ is retained as the source register size $W_S$. The destination register size $W_D$ is still the size retained at the processing by the step code (2-1).

Thus, in the step code (2-2), the distination register number $R_D$ shows the general-purpose register RI, the source register number $R_S$ shows the SD register 314, the destination register size $W_D$ shows a word, and the source register size $W_S$ shows a word. Accordingly, part of the information of the step code (2-1) is merged into the step code (2-2).

At the register direct mode, in the second decoder 304, one bit of low order of the entry address of the microprogram is outputted in an inverted fashion. Accordingly, the processing by the microinstruction differs in the case where the destination address is the register and in the other cases.

The R code 214 is generated from these entry address of microprogram, register number and the like.

The R code 214 and the F code 215 thus generated are simultaneously sent to the F stage 204.

When the R code/F code enable signal is enabled, the R stage 206 inputs the R code 214, and accesses to the micro ROM 105 with the entry address of the microprogram comprised therein. The output of the micro ROM 105 is decoded, becoming the E code 216 along with the register number and the like. The register shown by the source register number $R_S$ of this step code (2-2) is the SD register 314, and the register shown by the destination register number $R_D$ is the general-purpose register RI. The source register size $W_S$ and the destination register size $W_D$ are words, respectively.

When the R code/F code enable signal is enabled, the OF stage 207 inputs the F code 215. The value in the FA register 317 which is part of the F code 215 is the SP value of this instruction. Prefetching of the operand is performed from the stack top through the external bus interface unit 107 with the value in the FA register 317 taken as the address. By this access to this stack top, the prefetched value is read into the data processor of the present invention through the external bus interface unit 107, and is retained in the SD register 314 from the DD bus 320. The value in the SD register 314 is sent to the E stage 205 as part of the S code 217.

When the E stage 205 inputs the E code 216 and the S code 217, processing of "transfer the value in the register shown by the source register number $R_S$ to the register shown by the destination register number $R_D$" is performed.

In this case, the register shown by the destination register number $R_D$ is the general-purpose register RI, and the register shown by the source register number $R_S$ is the SD register 314. Accordingly, the value in the SD register 314 prefetched from the stack top is sent from the S1 bus 325 to the ALU 313, and is transferred from the DO bus 327 to the general-purpose register RI without being operated.

As described above, the step code (2-2) is processed in sequence in the pipeline processing mechanism.

In the data processor of the present invention, in the case where no waiting state is present in the pipeline processing mechanism, as shown in FIG. 36(b), the step code (2-1) and the step code (2-2) of the POP instruction are processed in sequence in each stage of the pipeline. During this time, the step code (2-1) disappears in the A stage 203, and only the required information is merged into the step code (2-2).

As shown in FIGS. 36(a) and (b), except for data storing operation in the E stage 205, the number of steps required for processing is the same both for the case where one of the step codes of the POP instruction is absorption-processed in the state that no waiting state is present in the pipeline processing mechanism and for the case where the step code is not merged.

Here, consideration is made on the case where since a step code (4-1) of the instruction one-preceding the POP instruction requires three steps for processing in the E stage 205, the step code of the POP instruction is put in the two-step waiting state in the F stage 204.

Figure 36D:
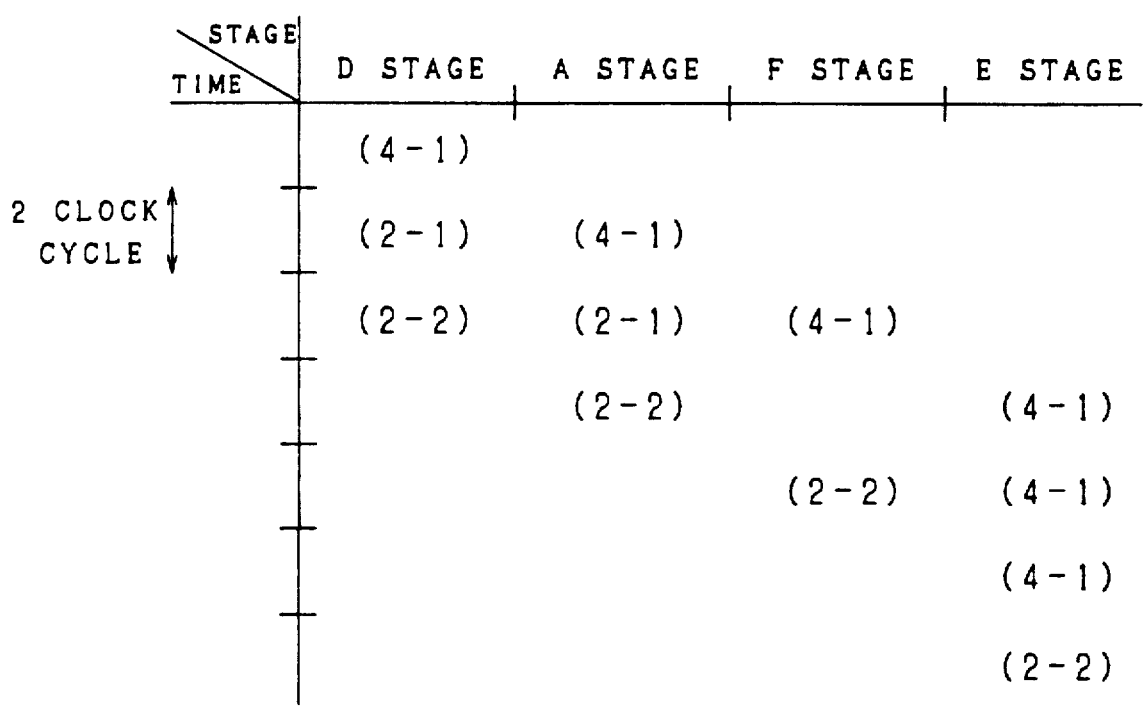

FIG. 36(c) shows the case where the step codes of the POP instruction are not merged, and FIG. 36(d) shows the case where one of the step codes of the POP instruction is merged.

As is clarified in FIG. 36(d), by the absorption of the step code (2-1), the number of step codes to be processed in the E stage 205 is decreased, and resultingly the number of steps required for the whole processing is decreased.

As described above, absorption of the unnecessary step code (2-1) into the pipeline processing mechanism has a great possibility of reducing the number of steps required for processing in the case where the waiting state has occurred in the pipeline processing mechanism, and thereby the processing speed of the data processor is improved.

As described above, in accordance with the data processor of the present invention, the processing unit relating to the source operand implied by the POP instruction is generated, and that processing unit is processed in a pipeline manner, and therefore an extremely balanced pipeline processing can be performed in processing the POP instruction, and an improvement in the processing speed as a whole can be realized.

Configuration is made in a manner that in performing the processing the POP instruction which is of the register direct addressing mode, the processing unit of the processing not required to be performed in the execution stage is extinguished, and therefore in the case where the waiting state has taken place in the pipeline processing mechanism, the number of processing steps required for execution of the POP instruction which is of the register direct mode is decreased, and the time occupied by the execution stage for that processing is reduced, and the processing speed of the data processor can be improved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of claims, or equivalence of such meets and bounds thereof are therefore intended to be embraced by the claims.

What is claimed is:

1. A method for determining the source and the destination locations for a POP instruction in a pipelined data processor, said destination being one of a plurality of potential destinations, including a plurality of memory locations and a plurality of registers, the data processor having a pipeline processing unit which includes at least a decode stage for decoding instructions, an address calculation stage, coupled to said decode stage, for calculating operand addresses and an execution stage, coupled to said address calculation stage, for executing instructions, said processing unit for processing any of a plurality of instructions, said POP instruction having a plurality of fields, at least one field being an operation code field having at least a portion of an operation code of said instruction, said POP instruction having an operand field for designating a destination operand, said POP instruction being without an operand field for designating a source operand, the method comprising:

decoding at least a portion of said POP instruction in said decoding stage including decomposing said POP instruction into at least a first step code and a second step code, each of said first and second step codes being different from said POP instruction;

transferring the first step code from said decoding stage to said address stage, said first step code including information contained in at least a portion of said operand field for use in calculating the address of said destination;

transferring said second step code from said decoding stage to said address stage, said second step code including information contained in at least a portion of said operation code field for use in calculating the address of said source, said second step code being different from said first step code;

calculating said address of said destination and said address of said source in said address stage, before or while said instruction is executed; and executing said POP instruction in said execution stage.

2. A method, as claimed in claim 1, wherein said step of calculating is performed without using contents of said operand field.

3. A method for determining the source and the destination locations for a POP instruction in a pipelined data processor, said destination being one of a plurality of potential destinations, including a plurality of memory locations and a plurality of registers, the data processor having a pipeline processing unit which includes at least a decode stage for decoding instructions, an address calculating stage, coupled to said decode stage, for calculating operand addresses and an execution stage, coupled to said address calculation stage, for executing instructions, said processing unit for processing any of a plurality of instructions, said POP instruction having a plurality of fields, at least one field being an operation code field having at least a portion of an operation code of said instruction, said POP instruction having an operand field for designating a destination operand, said POP instruction being without an operand field for designating a source operand, the method comprising:

decoding at least a portion of said POP instruction in said decoding stage wherein said step of decoding includes decomposing said POP instruction into a least a first step code and a second step code, said first step code being a code to be used at least by said address stage to calculate said address of said destination operand and said second step code being a code to be used at least by said address stage to calculate said address of said source operand, said processing of said first step code and said second step code occurring at least in said address stage;

transferring said first step code from said decoding stage to said address stage, for use in calculating the address of said destination;

transferring said second step code from said decoding stage to said address stage, for use in calculating the address of said source, said second step code being different from said first step code;

calculating said address of said destination and said address of said source in said address stage, before or while said instruction is executed;

executing said instruction in said execution stage; and transferring said second step code to said execution stage after said step of transferring said second step code from said decoding stage to said address stage and before said step of executing said POP instruction wherein said step of executing said POP instruction is performed without transferring said first step code to said execution stage when the destination is one of said registers and wherein said step of executing said POP instruction is performed after transferring the first step code to said execution stage when the destination is not one of said register.

4. A method for determining the source and the destinations specified by a POP instruction in a pipelined data processor, said destination being one of a plurality of potential destinations, including a plurality of memory locations and a plurality of registers, the data processor having a pipeline processing unit for processing any of a plurality of instructions which includes at least a decode stage for decoding instructions, an address calculation stage, coupled to said decode stage, for calculating operand addresses and an execution stage, coupled to said address calculation stage, for executing instructions, said pipeline processing unit including at least one stackpointer, coupled to said address calculation stage, for indicating an address of a stack top, said POP instruction having a plurality of fields, at least one field being an operation code field having at least a portion of an operation code of said POP instruction, said POP instruction having at least one operand field, different from said operation code field for designating a destination operand, said POP instruction being without an operand field for designating a source operand, the method comprising:

decoding at least a portion of said POP instruction in said decoding stage, including decomposing said POP instruction into a least a first step code and a second step code, each of said first and second step codes being different from said POP instruction;

transferring said first step code from said decoding stage to said address stage, said first step code including information contained in at least a portion of said operand field for use in determining which of said plurality of potential destinations is the destination specified by said POP instruction;

transferring said second step code from said decoding stage to said address stage, said second step code including information contained in at least a portion of said operation code field for use in calculating the address of said source said second information being different from said first information;

calculating an address of said source in said address calculation stage, using said stackpointer and said information contained in at least a portion of said operation code field, and calculating an address of said destination before or while the POP instruction is executed; and executing said POP instruction in said execution stage.

5. A method for determining the source and the destination locations specified by a POP instruction in a pipelined data processor, said destination being one of a plurality of potential destinations, including a plurality of memory locations and a plurality of registers, the data processor having a pipeline processing unit for processing any of a plurality of instructions which includes at least a decode stage for decoding instructions, an address calculation stage, coupled to said decode stage, for calculating operand addresses and an execution stage, coupled to said address calculation stage, for executing instructions, said pipeline processing unit including at least one stackpointer, coupled to said address calculation stage, for indicating an address of a stack top, said POP instruction having a plurality of fields, at least one field being an operation code field having at least a portion of an operation code of said POP instruction, said POP instruction having at least one operand field, different from said operation code field for designating a destination operand, said POP instruction being without an operand field for designating a source operand, the method comprising:

decoding at least a portion of said instruction in said decoding stage, wherein said step of decoding includes decomposing said POP instruction into at least a first step code and a second step code, said first step code being a code to be used at least by said address stage to calculate said address of said destination operand and said second step code being a code to be used at least by said address stage to calculate said address of said source operand, said processing of said first step code and said second step code occurring at least in said address stage;

transferring said first step code from said decoding stage to said address stage, for use in determining which of said plurality of potential destinations is the destination specified by said POP instruction;

transferring said second step code from said decoding stage to said address stage, for use in calculating the address of said source said second step code being different from said first step code;

calculating an address of said source in said address calculation stage, using said stackpointer and said information contained in at least a portion of said operation code field, and calculating an address of said destination before or while the instruction is executed;

executing said instruction in said execution stage;

transferring said first step code to said execution stage after said step of transferring said first step code from said decoding stage to said address stage and before said step of executing said instruction, said transferring of said first step code to said execution stage being performed when the destination is one of said plurality of destinations other than a register, wherein said step of executing said POP instruction is performed without transferring said first step code to said execution stage when the destination is one of said registers; and transferring said second step code from said address stage to said execution stage after said step of transferring said second step code to said address stage and before said step of executing said POP instruction.

6. A method for determining the source and the destination locations for a POP instruction in a pipelined data processor, said destination being one of a plurality of potential destinations, including a plurality of memory locations and a plurality of registers, the data processor having a pipeline processing unit for processing any of a plurality of instructions which includes at least a decode stage for decoding instructions, an address calculation stage, coupled to said decode stage, for calculating operand addresses, a fetch stage for fetching operands specified by said instruction and an execution stage, coupled to said address calculation stage, for executing instructions, said POP instruction having a plurality of fields, at least one field being an operation code field having at least a portion of an operation code of said POP instruction, the method comprising:

decomposing said POP instruction, in said decoding stage, into at least a first step code for processing said destination in one of said decoding stage, said address calculation stage and said fetch stage and a second step code for processing said source in said address calculation stage;

determining, in one of said decoding stage, said address calculation stage and said fetch stage of said pipeline processing unit, whether said destination is one of said registers;

transferring said second step code from said decoding stage to said address stage;

calculating said address of said destination and said address of said source in said address stage before or while said POP instruction is executed;

transferring said first step code to said execution stage when the destination is one of said plurality of destinations other than a register;

transferring said second step code from said address stage to said execution stage after said step of transferring said second step code to said address stage and before the step of executing said POP instruction; and executing said POP instruction in said execution stage, without transferring said first step code to said execution stage when the destination is one of said registers.

7. A method for executing a POP instruction in a pipelined data processor, said POP instruction having an operation code field, said POP instruction being an instruction for moving data from a source at a location in a stack specified by a stackpointer to a destination specified in an operand field of said POP instruction, the data processor having a pipeline processing unit which includes at least an execution portion and a pre-processing portion for performing pre-processing relating to at least a source, said pre-processing performed in at least a decoding stage and an address calculation stage, said pre-processing including at least one of the operations of operand address calculation, memory access checking, operand pre-fetch, and exception detection, the method comprising:

decoding at least a portion of said POP instruction in said decoding stage including decomposing said POP instruction into at least a first step code and a second step code, each of said first and second step codes being different from said POP instruction;

transferring said first step code from said decoding stage to said address stage, said first step code including information contained in at least a portion of said operand field for use in calculating the address of said destination;

transferring said second step code from said decoding stage to said address stage, said second step code including information contained in at least a portion of said operation code field for use in calculating the address of said source, said second step code being different from said first step code;

calculating the address of said source, in said preprocessing portion of said pipeline processing unit, using information in the operation code field of said POP instruction; and executing said instruction in said execution portion, said executing occurring after said step of performing preprocessing relating to said source.

8. A method, as claimed in claim 7, wherein said first step code includes information for processing said destination in said address calculation stage and said second step code contains information for processing said source in said address calculation stage.

9. Apparatus for determining the source and the destination locations for a POP instruction in a pipelined data processor, said destination being one of a plurality of potential destinations, including a plurality of memory locations and a plurality of registers, the data processor having a pipeline processing unit for processing any of a plurality of instructions, said POP instruction having a plurality of fields, at least one field being an operation code field having at least a portion of an operation code of said POP instruction, said POP instruction having an operand field for designating a destination, said POP instruction being without an operand field for designating a source, the apparatus comprising:

a decode stage of said pipeline processing unit including a first decoder for decoding at least a portion of said POP instruction into different first and second step codes, for transferring said first step code from said decoding stage to an address calculation stage and for transferring said second step code from said decoding stage to said address stage, said first step code including information for use in calculating the address of the destination operand and said second step code including information for use in calculating the address of the source, said first step code including information contained in at least a portion of said operand field, said second step code including information contained in at least a portion of said operation code field, each of said first and second step codes being different from said POP instruction; and said address calculation stage, coupled to said decode stage, including circuitry for outputting an address of said destination using said first step code and for outputting an address of said source using said second step code without using the contents of said operand field.

10. Apparatus for determining the source and the destination locations for a POP instruction in a pipelined data processor, said destination being one of a plurality of potential destinations, including a plurality of memory locations and a plurality of registers, the data processor having a pipeline processing unit for processing any of a plurality of instructions, said pipeline processing unit including at least one stackpointer for indicating an address of a stack top, said POP instruction having a plurality of fields, at least one field being an operation code field having at least a portion of an operation code of said POP instruction, said POP instruction having an operand field, different from said operation code field, the apparatus comprising:

a decode stage of said pipeline processing unit including a first decoder for decoding at least a portion of said POP instruction into different first and second step codes, for transferring said first step code from said decoding stage to an address calculating stage and for transferring said second step code from said decoding stage to said address calculating stage, said first step code including information for use in calculating the address of the destination operand and said second step code including information for use in calculating the address of the source said first step code including information contained in at least a portion of said operand field, said second step code including information contained in at least a portion of said operation code field, each of said first and second step codes being different from said POP instruction; and said address calculation stage, coupled to said decode stage, including circuitry for outputting an address of said destination using said first step code and for outputting an address of said source using said second step code and using said stackpointer.

11. Apparatus for pipeline processing of a POP instruction in a computer, said POP instruction being an instruction for transferring data from a stack source to a destination, said destination being specified in an operand field of said POP instruction, said POP instruction being without an operand field for designating a source, the computer having a pipeline processing unit for processing any of a plurality of instructions, the apparatus comprising:

a decode stage of said pipeline processing unit including a first decoding means for receiving said POP instruction and outputting first and second step codes, said first step code including information for calculating the address of said destination, using information from said operand field, said second step code including information for calculating the address of said source, without using information from any operand field of said POP instruction said second step code being different from said first step code, each of said first and second step codes being different from said instruction;

an address calculation stage, coupled to said decode stage, for receiving said first and second step codes and calculating at least said source address; and an execution stage, coupled to at least one of said decode stage and said address calculation stage, for receiving at least one of said first and second step codes and, in response, executing said POP instruction to transfer data from said stack source to said destination.

12. Apparatus for pipeline processing of a POP instruction in a computer, said POP instruction being an instruction for transferring data from a stack source to a destination, said destination being one of a plurality of potential destinations, including a plurality of memory locations and a plurality of registers, the computer having a pipeline processing unit for processing any of a plurality of instructions, the apparatus comprising:

a first, decode stage of said pipeline processing unit including a first decoding means for receiving said POP instruction and outputting first and second step codes, said first step code including information for determining said destination, said second step code including information for determining said source;

a second stage, coupled to said decode stage, for receiving said first and second step codes, for determining said destination and said source, and for outputting only one of said first and second step codes when said destination is one of said plurality of registers, said one step code containing sufficient information for execution of said POP instruction including an identification of the destination register; and an execution stage, coupled to at least one of said first stage and said second stage, for receiving said one of said first and second step codes and, in response, executing said POP instruction to transfer data from said stack source to said destination register, using said identification of said destination register.

* * * * *